United States Patent
Bisserier et al.

(10) Patent No.: US 12,502,382 B2
(45) Date of Patent: Dec. 23, 2025

(54) EPAC1 INHIBITORS FOR THE TREATMENT OF IDIOPATHIC PULMONARY FIBROSIS

(71) Applicants: INSERM (Institut National de la Santé et de la Recherche Médicale), Paris (FR); Université Paul Sabatier Toulouse III, Toulouse (FR); Icahn School of Medicine at Mount Sinai, New York, NY (US)

(72) Inventors: Malik Bisserier, New York, NY (US); Frank Lezoualc'h, Toulouse (FR); Lahouaria Hadri, New York, NY (US)

(73) Assignees: INSERM (INSTITUT NATIONAL DE LA SANTÉ ET DE LA RECHERCHE MÉDICALE), Paris (FR); Université Paul Sabatier Toulouse III, Toulouse (FR); Icahn School of Medicine at Mount Sinai

( * ) Notice: Subject to any disclaimer, the term of this patent is extended or adjusted under 35 U.S.C. 154(b) by 771 days.

(21) Appl. No.: 17/783,928

(22) PCT Filed: Dec. 11, 2020

(86) PCT No.: PCT/EP2020/085730
§ 371 (c)(1),
(2) Date: Jun. 9, 2022

(87) PCT Pub. No.: WO2021/116389
PCT Pub. Date: Jun. 17, 2021

(65) Prior Publication Data
US 2023/0030517 A1    Feb. 2, 2023

(30) Foreign Application Priority Data
Dec. 13, 2019  (EP) .................................... 19306645

(51) Int. Cl.
*A61K 31/4365* (2006.01)
*A61K 31/47* (2006.01)
*A61P 11/00* (2006.01)

(52) U.S. Cl.
CPC .......... *A61K 31/4365* (2013.01); *A61K 31/47* (2013.01); *A61P 11/00* (2018.01)

(58) Field of Classification Search
CPC ...... A61K 31/4365; A61K 31/47; A61P 11/00
(Continued)

(56) References Cited

U.S. PATENT DOCUMENTS

2013/0274215 A1  10/2013  Thies et al.
2018/0015077 A1   1/2018  Nakamura et al.

FOREIGN PATENT DOCUMENTS

WO    2014/116859 A1    7/2014
WO    2018/237084 A1   12/2018
WO    2019/234197 A1   12/2019

OTHER PUBLICATIONS

Wikipedia, Idiopathic pulmonary fibrosis, Jul. 27, 2018, p. 1-11). (Year: 2018).*

(Continued)

*Primary Examiner* — Taylor V Oh
(74) *Attorney, Agent, or Firm* — WCF IP

(57) ABSTRACT

The present invention relates to the treatment of idiopathic pulmonary fibrosis. Today, there is no cure for IFF. The inventors showed that EPAC1 inhibitors, in particular CE3F4 and AM-001, represent a promising therapeutic strategy for treating patients with pulmonary fibrosis. The present invention thus relates to an EPAC1 inhibitor for use in the treatment and/or prevention of idiopathic pulmonary fibrosis.

14 Claims, 10 Drawing Sheets

Figure 1:
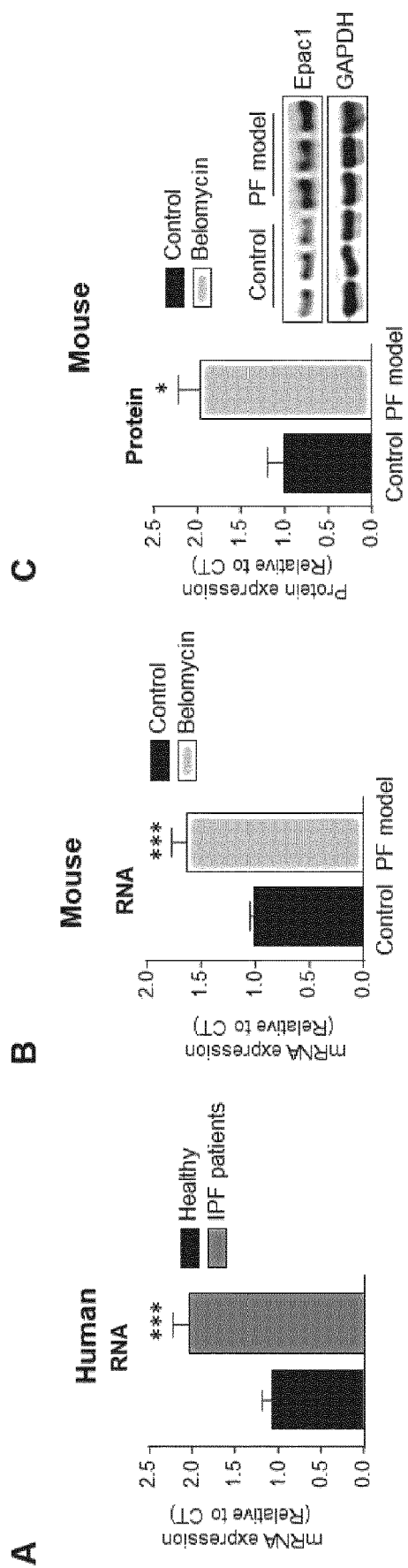

(58) Field of Classification Search
USPC .......................................................... 514/311
See application file for complete search history.

(56) References Cited

OTHER PUBLICATIONS

Huang et al.; "Prostaglandin E 2 Inhibits Specific Lung Fibroblast Functions via Selective Actions of PKA and Epac-1"; American Journal of Respiratory Cell and Molecular Biology, vol. 39, No. 4, Oct. 1, 2008, pp. 482-489.

* cited by examiner

EPAC1 INHIBITORS FOR THE TREATMENT OF IDIOPATHIC PULMONARY FIBROSIS

This invention was made with US government support under HL133554 awarded by the National Institutes of Health. The US government has certain rights in the invention.

The present invention concerns EPAC1 inhibitors for the treatment of idiopathic pulmonary fibrosis.

Idiopathic pulmonary fibrosis (IPF) is a rare disease characterized by chronic and a progressive fibrosing interstitial pneumonia of unknown etiology, for which there is no effective therapy available. To date, despite extensive research in experimental and clinical studies, IPF remains an increasing cause of morbidity and mortality with an average survival of 3 years or less from diagnosis. Unfortunately, there is no cure for IPF.

Therefore, there is a critical need to identify new therapeutic target and strategy for treating patients with IPF.

The aim of the present invention is to provide new therapeutic targets and also to provide a safe and efficient strategy by using small compounds to block and potentially reverse this progressive deadly lung disease.

The aim of the present invention is thus to provide small molecules for treating IPF.

Therefore, the present invention relates to an EPAC1 inhibitor for use for the treatment, prevention and/or reversion, preferably the treatment, of idiopathic pulmonary fibrosis.

The present invention is based on the fact that Exchange protein regulated by cAMP 1 (Epac1) expression was significantly increased in lung tissue from patients with IPF and Bleomycin-challenged mice compared to controls.

The pharmacological inhibition of Epac1 significantly decreases the proliferation and prevents the expression of several fibrosis markers. Remarkably, it was also found that the pharmacological inhibition of Epac1 significantly decreased lung fibrosis in vivo using the bleomycin-induced PF mice model.

Preferably, the EPAC1 inhibitors for the use according to the invention are chosen from EPAC1 selective inhibitors.

In one embodiment, EPAC1 selective inhibitors are compounds which exhibit an inhibitory effect on the EPAC1 isoform. More particularly, they generally exhibit an inhibitory effect on EPAC1 and moderate or no inhibitory effect on EPAC2 isoform.

By "selective EPAC1 inhibitor" it may be understood the ability of the EPAC1 inhibitors to affect the particular EPAC1 isoform, in preference to the other isoform EPAC2. The EPAC1 selective inhibitors may have the ability to discriminate between these two isoforms, and so affect essentially the EPAC1 isoform.

The term "inhibitor" is to be understood as "antagonist".

According to an embodiment, the EPAC1 inhibitor for the use according to the invention is a compound having the formula (I):

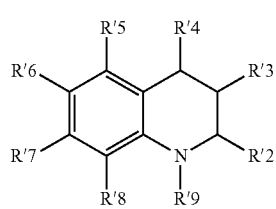

(I)

wherein:
R'9 is H or

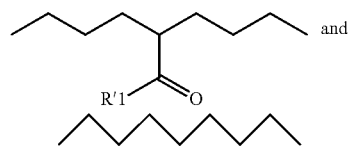

is the attachment to the nitrogen atom of the tetrahydroquinoline;

R'1, R'2, R'3, R'4, and R'8 are independently chosen from the group consisting of: H, $(C_1-C_{10})$alkyl, $(C_3-C_{10})$cycloalkyl, $(C_6-C_{10})$aryl, $(C_1-C_6)$alkylene-$(C_6-C_{10})$aryl and $(C_3-C_{10})$heteroaryl, said aryl and heteroaryl groups being possibly substituted by at least one substituent chosen from: OH, $NH_2$, $NO_2$, $(C_1-C_6)$alkyl, and halogen;

R'5 is an halogen atom;

R'6 and R'7 are independently chosen from the group consisting of: H and halogen atoms;

or its pharmaceutically acceptable salts, hydrates or hydrated salts or its polymorphic crystalline structures, racemates, diastereomers or enantiomers.

According to an embodiment, the compound of formula (I) is different from the following compound:

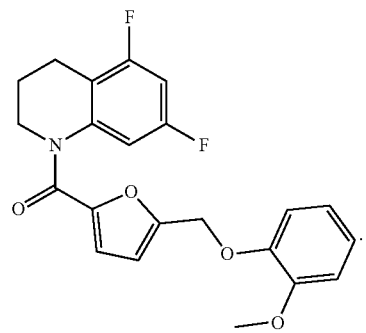 [SMILES: COc1ccccc1OCc1ccc(C(=O)N2CCCc3c(F)cc(F)cc32)o1]

In the context of the invention, the term "treating" or "treatment", as used herein, means reversing, alleviating, inhibiting the progress of the disorder or condition to which such term applies, or one or more symptoms of such disorder or condition.

In the context of the invention, the term "preventing" or "prevention", as used herein, means avoiding the appearance or the progress of the disorder or condition to which such term applies, or one or more symptoms of such disorder or condition.

Therefore, a first family of EPAC1 inhibitors for the use according to the present invention consists of tetrahydroquinoline derivatives.

According to the invention, the term "$(C_1-C_{10})$alkyl" means a saturated or unsaturated aliphatic hydrocarbon group which may be straight or branched having 1 to 10 carbon atoms in the chain. Preferred alkyl groups have 1 to 4 carbon atoms in the chain, preferred alkyl groups are in particular methyl or ethyl groups. "Branched" means that one or lower alkyl groups such as methyl, ethyl or propyl are attached to a linear alkyl chain.

The term "$(C_1-C_6)$alkylene-" means a saturated or unsaturated aliphatic hydrocarbon divalent radical which may be straight or branched having 1 to 6 carbon atoms in the chain. For example, a preferred (C$_1$-C$_6$)alkylene-(C$_6$-C$_{10}$)aryl is a benzyl group.

By "(C$_3$-C$_{10}$)cycloalkyl" is meant a cyclic, saturated hydrocarbon group having 3 to 10 carbon atoms, in particular cyclopropyl or cyclohexyl groups.

The term "(C$_6$-C$_{10}$)aryl" refers to an aromatic monocyclic, bicyclic, or tricyclic hydrocarbon ring system wherein any ring atom capable of substitution may be substituted by a substituent. Examples of aryl moieties include, but are not limited to, phenyl.

The term "(C$_3$-C$_{10}$)heteroaryl" refers to an aromatic monocyclic, bicyclic, or tricyclic hydrocarbon ring system, wherein any ring atom capable of substitution may be substituted by a substituent and wherein one or more carbon atom(s) are replaced by one or more heteroatom(s) such as nitrogen atom(s), oxygen atom(s) and sulphide atom(s); for example 1 or 2 nitrogen atom(s), 1 or 2 oxygen atom(s), 1 or 2 sulphide atom(s) or a combination of different heteroatoms such as 1 nitrogen atom and 1 oxygen atom. Preferred heteroaryl groups are pyridyl, pyrimydyl and oxazyl groups.

The term "halogen" refers to the atoms of the group 17 of the periodic table and includes in particular fluorine, chlorine, bromine, and iodine atoms, more preferably fluorine, chlorine and bromine atoms.

By "tetrahydroquinoline" it is understood the following group:

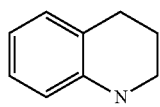

The compounds herein described may have asymmetric centers. Compounds of the present invention containing an asymmetrically substituted atom may be isolated in optically active or racemic forms. It is well-known in the art how to prepare optically active forms, such as by resolution of racemic forms or by synthesis from optically active starting materials. All chiral, diastereomeric, racemic forms and all geometric isomeric forms of a compound are intended, unless the stereochemistry or the isomeric form is specifically indicated.

In an embodiment, the carbon atom referred to with (*) in the formula (I) with R'2 to R'9 as defined above may be (R) or (S):

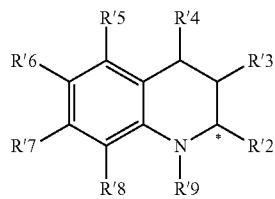

In an embodiment, it is (R). In a particular embodiment, the enantiomeric form (R) of the compound of formula (I) is preferred and more particularly the following enantiomeric form:

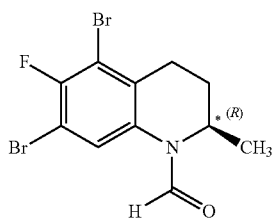

In another embodiment, the (R)-enantiomeric form of the compound of formula (I) is a more potent cAMP antagonist than racemic and (S)-enantiomeric form of the compound of formula (I). In one embodiment, the (R)-enantiomeric form of the compound of formula (I) is a selective inhibitor of EPAC1. Said (R)-enantiomeric form may inhibit the GEF activity of EPAC1 with 10-times more efficiency than the (S)-enantiomeric form.

The term "pharmaceutically acceptable salt" refers to salts which retain the biological effectiveness and properties of the compounds of the invention and which are not biologically or otherwise undesirable. Pharmaceutically acceptable acid addition salts may be prepared from inorganic and organic acids, while pharmaceutically acceptable base addition salts can be prepared from inorganic and organic bases. For a review of pharmaceutically acceptable salts see Berge, et al. ((1977) J. Pharm. Sd, vol. 66, 1). For example, the salts include those derived from inorganic acids such as hydrochloric, hydrobromic, sulfuric, sulfamic, phosphoric, nitric, and the like, as well as salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicyclic, sulfanilic, fumaric, methanesulfonic, and toluenesulfonic acid and the like.

In a particular embodiment, the compounds of the invention have the following formula (I-1):

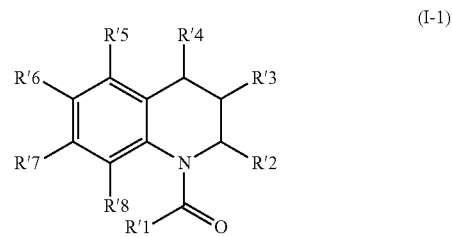

that is in formula (I), R'9 is

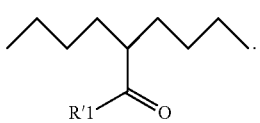

In a particular embodiment, the EPAC1 inhibitors for the use according to the present invention have the following formula (I-1):

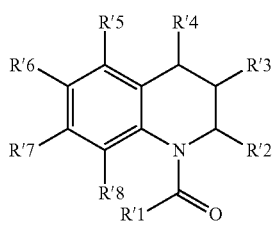

(I-1)

wherein
R'1, R'2, R'3, R'4 and R'8 are independently chosen from the group consisting of: H, (C$_1$-C$_{10}$)alkyl, (C$_3$-C$_{10}$)cycloalkyl, (C$_6$-C$_{10}$)aryl, (C$_1$-C$_6$)alkylene-(C$_6$-C$_{10}$)aryl and (C$_3$-C$_{10}$)heteroaryl; said aryl and heteroaryl groups being possibly substituted by at least one substituent chosen from OH, NH$_2$, NO$_2$, (C$_1$-C$_6$)alkyl and halogen;
R'5 is an halogen atom;
R'6 and R'7 are independently chosen from the group consisting of H and halogen atoms;
or its pharmaceutically acceptable salts, hydrates or hydrated salts or its polymorphic crystalline structures, racemates, diastereomers or enantiomers.

In a particular embodiment, in formula (I-1) as defined above, R'1 is H.

In a particular embodiment, in formula (I) or (I-1), R'2 is H or a (C$_1$-C$_{10}$)alkyl.

In a particular embodiment, in formula (I) or (I-1), R'2 is a (C$_1$-C$_{10}$)alkyl. Preferably, R'2 is a (C$_1$-C$_4$)alkyl.

More preferably, in formula (I) or (I-1), R'2 is a methyl group. In another embodiment, R'2 is H. Preferably, in formula (I) or (I-1), R'2 is H or a methyl group.

In a particular embodiment, in formula (I) or (I-1), R'3 is H.

In another embodiment, in formula (I) or (I-1), R'4 is H.

In another embodiment, in formula (I) or (I-1), R'8 is H.

In one embodiment, in formula (I) or (I-1), R'3, R'4 and R'8 are H.

In a particular embodiment, in formula (I) or (I-1), the (C$_3$-C$_{10}$)heteroaryl group is chosen from the group consisting of pyridyl, pyrimydyl and oxazyl groups.

In another embodiment, in formula (I) or (I-1), the (C$_6$-C$_{10}$)aryl group is a phenyl group.

In another embodiment, in formula (I) or (I-1), the (C$_1$-C$_6$)alkylene-(C$_6$-C$_{10}$)aryl is a benzyl group.

In a particular embodiment, in formula (I) or (I-1), R'5 is chosen from the group consisting of F, Cl, Br and I. Preferably, R'5 is Br.

In a particular embodiment, in formula (I) or (I-1), R'6 is chosen from the group consisting of: H, F, Cl, Br and I.

In a particular embodiment, in formula (I) or (I-1), R'6 is chosen from the group consisting of: F, Cl, Br and I.

In another embodiment, in formula (I) or (I-1), R'6 is F. In another embodiment, in formula (I) or (I-1), R'6 is H. Preferably, in formula (I) or (I-1), R'6 is H or F.

In a particular embodiment, in formula (I) or (I-1), R'7 is chosen from the group consisting of H, F, Cl, Br and I.

In a particular embodiment, in formula (I) or (I-1), R'7 is chosen from the group consisting of: F, Cl, Br and I. In another embodiment, R'7 is Br. In another embodiment, R'7 is H. Preferably, R'7 is H or Br.

In a preferred embodiment, in formula (I) or (I-1), R'1 is H and R'5 is Br.

In another preferred embodiment, in formula (I) or (I-1), at least two of R'5, R'6 and R'7 are halogen.

The above-mentioned particular embodiments can be combined with each other.

Some specific EPAC1 inhibitors for the use as defined above have the following formulae:

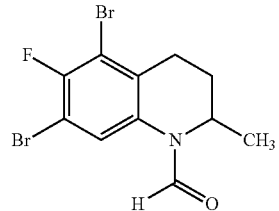 [SMILES: CC1CCc2c(cc(Br)c(F)c2Br)N1C=O]

named herein CE3F4,

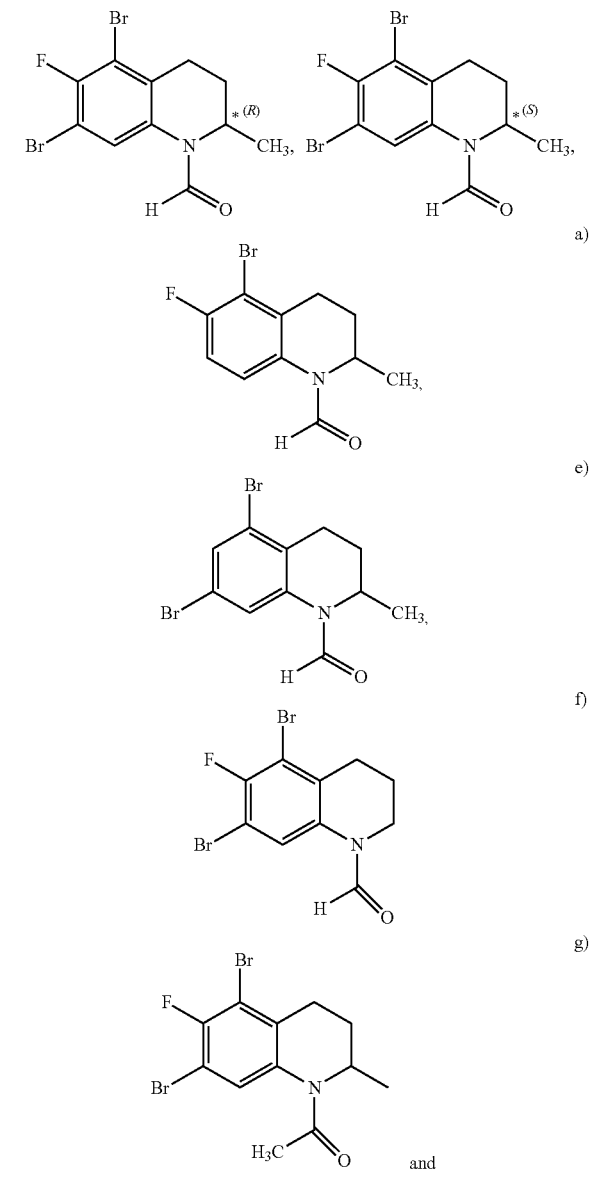

-continued

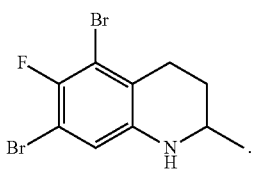

h)

More particularly, some specific compounds for the use as defined above have the following formulae:

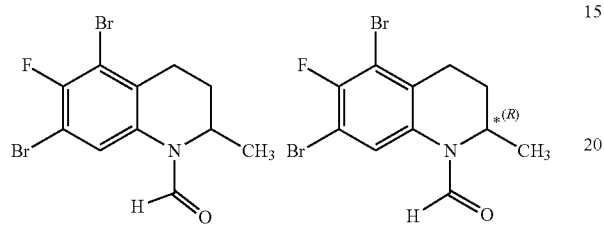

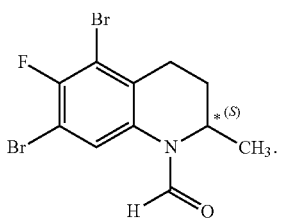

a)

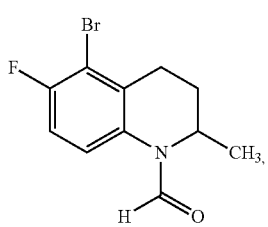

e)

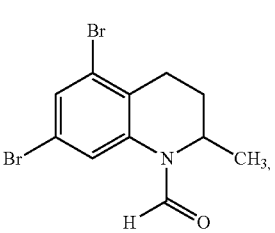

f)

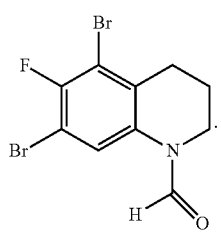

In one embodiment, the EPAC1 inhibitor for the use according to the invention is a compound having the following formula:

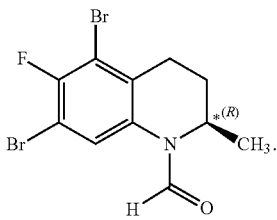

Other EPAC1 inhibitors may be mentioned such as the following tetrahydroquinoline derivatives:

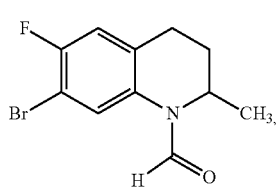

b)

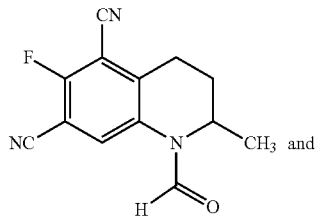

c)

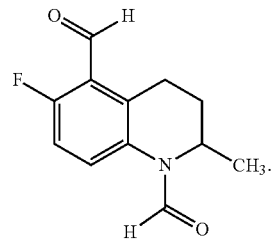

d)

The compounds of formula (I) can be synthesized according to previously published methods in P. Bouyssou et al., J. Heterocyclic Chem., 29, 895, 1992. Methods of preparation of the compounds of formula (I) are well-known.

According to an embodiment, the EPAC1 inhibitor for the use according to the invention is a compound having the formula (II):

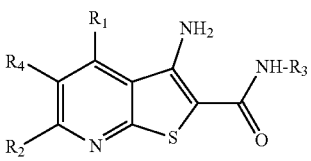

(II)

wherein:
$R_1$ is selected from the group consisting of:
H;
$(C_2-C_{20})$alkyl;
$(C_3-C_{10})$cycloalkyl;
3-10 membered heterocycloalkyl;
$(C_6-C_{10})$aryl; and
5-10 membered heteroaryl;

wherein said alkyl, cycloalkyl, heterocycloalkyl, aryl and heteroaryl groups are optionally substituted;
$R_2$ is selected from the group consisting of:
H;
$(C_1-C_{20})$alkyl;
$(C_3-C_{10})$cycloalkyl;
3-10 membered heterocycloalkyl;
$(C_6-C_{10})$aryl; and
5-10 membered heteroaryl;
or $R_2$ and $R_4$ together with the carbon atoms carrying them form a $(C_3-C_{10})$cycloalkyl group;
wherein said alkyl, cycloalkyl, heterocycloalkyl, aryl and heteroaryl groups are optionally substituted;
$R_3$ is selected from the group consisting of:
H;
$(C_3-C_{10})$cycloalkyl;
3-10 membered heterocycloalkyl;
$(C_6-C_{10})$aryl; and
5-10 membered heteroaryl;
wherein said cycloalkyl, heterocycloalkyl, aryl and heteroaryl groups are optionally substituted; and
$R_4$ is selected from the group consisting of: H, —OH, —NRxRy and —C(O)ORz,
Rx, Ry and Rz being independently of each other H or a $(C_1-C_{10})$alkyl;
or $R_2$ and $R_4$ together with the carbon atoms carrying them form a $(C_3-C_{10})$cycloalkyl group;
or its pharmaceutically acceptable salt, hydrate or hydrated salt or its polymorphic crystalline structure, racemate, diastereomer or enantiomer.

Therefore, a second family of EPAC1 inhibitors for the use according to the present invention consists of thieno[2,3-b]pyridine derivatives.

In formula (II), the term "$(C_1-C_{20})$alkyl" or "$(C_2-C_{20})$ alkyl" means a saturated or unsaturated aliphatic hydrocarbon group which may be straight or branched, having 1 to 20 carbon atoms or 2 to 20 carbon atoms respectively in the chain. Preferred alkyl groups have 1 to 5 carbon atoms in the chain, preferred alkyl groups are in particular methyl or ethyl groups. "Branched" means that one or lower alkyl groups such as methyl, ethyl or propyl are attached to a linear alkyl chain. Alkyl group may be substituted.

In formula (II), by "$(C_3-C_{10})$cycloalkyl" is meant a cyclic, saturated hydrocarbon group having 3 to 10 carbon atoms, wherein any carbon atom capable of substitution may be substituted by a substituent. In particular, cycloalkyl groups are cyclopropyl or cyclohexyl groups.

By "3-10 membered heterocycloalkyl" is meant a cyclic, saturated hydrocarbon group having 3 to 10 carbon atoms and wherein one or more carbon atom(s) are replaced by one or more heteroatom(s) such as nitrogen atom(s), oxygen atom(s) and sulfur atom(s); for example 1 or 2 nitrogen atom(s), 1 or 2 oxygen atom(s), 1 or 2 sulfur atom(s) or a combination of different heteroatoms such as 1 nitrogen atom and 1 oxygen atom. Any ring atom capable of substitution may be substituted by a substituent. Preferred 3-10 membered heterocycloalkyl are furan, thiophene, nitrogen rings such as pyrrole or pyrazole or fluorophenyl rings.

In formula (II), the term "$(C_6-C_{10})$aryl" refers to an aromatic monocyclic, bicyclic, or tricyclic hydrocarbon ring system wherein any ring atom capable of substitution may be substituted by a substituent. Examples of aryl moieties include, but are not limited to, phenyl.

The term "5-10 membered heteroaryl" refers to an aromatic monocyclic, bicyclic, or tricyclic hydrocarbon ring system, wherein any ring atom capable of substitution may be substituted by a substituent and wherein one or more carbon atom(s) are replaced by one or more heteroatom(s) such as nitrogen atom(s), oxygen atom(s) and sulfur atom(s); for example 1 or 2 nitrogen atom(s), 1 or 2 oxygen atom(s), 1 or 2 sulfur atom(s) or a combination of different heteroatoms such as 1 nitrogen atom and 1 oxygen atom. Preferred heteroaryl groups are thienyl, pyridyl, pyrimydyl and oxazyl groups, more preferably thienyl group.

The term "halogen" refers to the atoms of the group 17 of the periodic table and includes in particular fluorine, chlorine, bromine, and iodine atoms, more preferably fluorine, chlorine and bromine atoms, for example fluorine.

By "optionally substituted", it may be meant that the alkyl, cycloalkyl, heterocycloalkyl, aryl and heteroaryl groups of the compounds of the invention are optionally substituted by one or more substituent(s) selected from the group consisting of: —OH, halogen atom, —C(O)OH, —$(C_1-C_{10})$alkyl, —$(C_1-C_{10})$alkoxy, and —$NR_7R_8$ group, wherein R, and $R_a$ are independently of each other selected from $(C_1-C_{10})$alkyl or H.

Preferably, said alkyl, cycloalkyl, heterocycloalkyl, aryl and heteroaryl groups are optionally substituted by one or more halogen atom(s), more preferably by a fluorine atom.

The terms "thieno[2,3-b]pyridine derivatives" refer to compounds derived from the following chemical structure:

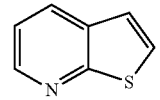

The compounds herein described may have asymmetric centers. Compounds of the present invention containing an asymmetrically substituted atom may be isolated in optically active or racemic forms. It is well-known in the art how to prepare optically active forms, such as by resolution of racemic forms or by synthesis from optically active starting materials. All chiral, diastereomeric, racemic forms and all geometric isomeric forms of a compound are intended, unless the stereochemistry or the isomeric form is specifically indicated.

The term "pharmaceutically acceptable salt" refers to salts which retain the biological effectiveness and properties of the compounds of the invention and which are not biologically or otherwise undesirable. Pharmaceutically acceptable acid addition salts may be prepared from inorganic and organic acids, while pharmaceutically acceptable base addition salts can be prepared from inorganic and organic bases. For a review of pharmaceutically acceptable salts see Berge, et al. ((1977) J. Pharm. Sd, vol. 66, 1). For example, the salts include those derived from inorganic acids such as hydrochloric, hydrobromic, sulfuric, sulfamic, phosphoric, nitric, and the like, as well as salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicyclic, sulfanilic, fumaric, methanesulfonic, and toluenesulfonic acid and the like.

A preferred family of EPAC1 inhibitors consists of compounds having the above formula (II), wherein:
$R_1$ is selected from the group consisting of:
$(C_2-C_{20})$alkyl;
$(C_3-C_{10})$cycloalkyl;
3-10 membered heterocycloalkyl;
$(C_6-C_{10})$aryl; and
5-10 membered heteroaryl;

wherein said alkyl, cycloalkyl, heterocycloalkyl, aryl and heteroaryl groups are optionally substituted;
$R_2$ is selected from the group consisting of:
- H;
- $(C_1-C_{20})$alkyl;
- $(C_3-C_{10})$cycloalkyl;
- $(C_6-C_{10})$aryl; and
- 5-10 membered heteroaryl;
or $R_2$ and $R_4$ together with the carbon atoms carrying them form a $(C_3-C_{10})$cycloalkyl group;
wherein said alkyl, cycloalkyl, heterocycloalkyl, aryl and heteroaryl groups are optionally substituted;
$R_3$ is selected from the group consisting of:
- H;
- $(C_3-C_{10})$cycloalkyl;
- 3-10 membered heterocycloalkyl;
- $(C_6-C_{10})$aryl; and
- 5-10 membered heteroaryl;
wherein said cycloalkyl, heterocycloalkyl, aryl and heteroaryl groups are optionally substituted; and
$R_4$ is selected from the group consisting of: H, —OH, —NRxRy and —C(O)ORz,
Rx, Ry and Rz being independently of each other H or a $(C_1-C_{10})$alkyl;
or $R_2$ and $R_4$ together with the carbon atoms carrying them form a $(C_3-C_{10})$cycloalkyl group;
or its pharmaceutically acceptable salt, hydrate or hydrated salt or its polymorphic crystalline structure, racemate, diastereomer or enantiomer.

A preferred family of EPAC1 inhibitors consists of compounds having the above formula (II), wherein:
$R_1$ is selected from the group consisting of:
- $(C_2-C_{20})$alkyl;
- $(C_3-C_{10})$cycloalkyl;
- 3-10 membered heterocycloalkyl;
- $(C_6-C_{10})$aryl; and
- 5-10 membered heteroaryl;
wherein said alkyl, cycloalkyl, heterocycloalkyl, aryl and heteroaryl groups are optionally substituted;
$R_2$ is selected from the group consisting of:
- H;
- $(C_1-C_{20})$alkyl;
- $(C_3-C_{10})$cycloalkyl;
- $(C_6-C_{10})$aryl; and
- 5-10 membered heteroaryl;
or $R_2$ and $R_4$ together with the carbon atoms carrying them form a $(C_3-C_{10})$cycloalkyl group;
wherein said alkyl, cycloalkyl, aryl and heteroaryl groups are optionally substituted;
$R_3$ is selected from the group consisting of:
- H;
- $(C_3-C_{10})$cycloalkyl;
- 3-10 membered heterocycloalkyl;
- $(C_6-C_{10})$aryl; and
- 5-10 membered heteroaryl;
wherein said cycloalkyl, heterocycloalkyl, aryl and heteroaryl groups are optionally substituted; and
$R_4$ is selected from the group consisting of: H, —OH, —NRxRy and —C(O)ORz,
Rx, Ry and Rz being independently of each other H or a $(C_1-C_{10})$alkyl;
or $R_2$ and $R_4$ together with the carbon atoms carrying them form a $(C_3-C_{10})$cycloalkyl group;
or its pharmaceutically acceptable salt, hydrate or hydrated salt or its polymorphic crystalline structure, racemate, diastereomer or enantiomer.

According to an embodiment, in formula (II), $R_3$ is selected from the group consisting of:
- $(C_3-C_{10})$cycloalkyl;
- 3-10 membered heterocycloalkyl;
- $(C_6-C_{10})$aryl; and
- 5-10 membered heteroaryl;
wherein said cycloalkyl, heterocycloalkyl, aryl and heteroaryl groups are optionally substituted.

In a particular embodiment, in formula (II), $R_3$ is a $(C_6-C_{10})$aryl optionally substituted by one or more substituent(s), preferably selected from the group consisting of: $(C_1-C_{10})$alkyl and halogen atom. In one embodiment, $R_3$ is H or a $(C_6-C_{10})$aryl optionally substituted by one or more substituent(s) selected from the group consisting of: $(C_1-C_{10})$alkyl and halogen atom. In a particular embodiment, $R_3$ is H or a phenyl optionally substituted by one or more halogen atom(s). In a particular embodiment, $R_3$ is a phenyl optionally substituted, preferably by one or more halogen atom(s).

According to an embodiment, in formula (II), $R_1$ is selected from the group consisting of:
- H;
- $(C_6-C_{10})$aryl; and
- 5-10 membered heteroaryl;
wherein said aryl and heteroaryl groups are optionally substituted by one or more substituent(s) selected from the group consisting of —$NR_7R_8$, $(C_1-C_{10})$alkyl and halogen atom; wherein R, and $R_8$ are independently of each other selected from $(C_1-C_{10})$alkyl or H.

According to an embodiment, in formula (II), $R_1$ is H or a $(C_6-C_{10})$aryl optionally substituted by one or more substituent(s), for example by substituents selected from the group consisting of: $(C_1-C_{10})$alkyl, halogen atom and a —$NR_7R_8$ group; wherein R, and $R_8$ are independently of each other selected from $(C_1-C_{10})$alkyl or H. In a particular embodiment, $R_1$ is H or a phenyl optionally substituted by one or more halogen atom(s), for example by one fluorine atom, preferably in the para position.

In another embodiment, $R_1$ is selected from the group consisting of:
- $(C_6-C_{10})$aryl; and
- 5-10 membered heteroaryl;
wherein said aryl and heteroaryl groups are optionally substituted by one or more substituent(s) selected from the group consisting of: $(C_1-C_{10})$alkyl, halogen atom and a —$NR_7R_8$ group; wherein R, and $R_8$ are independently of each other selected from $(C_1-C_{10})$alkyl or H.

Preferably, in formula (II), $R_1$ is a $(C_6-C_{10})$aryl optionally substituted by one or more substituent(s), for example by substituents selected from the group consisting of: $(C_1-C_{10})$alkyl, halogen atom and a —$NR_7R_8$ group; wherein R, and $R_8$ are independently of each other selected from $(C_1-C_{10})$alkyl or H. In a particular embodiment, $R_1$ is a phenyl optionally substituted by one or more halogen atom(s), for example by one fluorine atom, preferably in the para position.

According to an embodiment, in formula (II), $R_2$ is selected from the group consisting of:
- H;
- $(C_1-C_{20})$alkyl;
- $(C_6-C_{10})$aryl; and
- 5-10 membered heteroaryl;
or $R_2$ and $R_4$ together with the carbon atoms carrying them form a $(C_3-C_{10})$cycloalkyl group;

wherein said alkyl, cycloalkyl, aryl and heteroaryl groups are optionally substituted by one or more substituent(s) selected from the group consisting of: $(C_1-C_{10})$alkyl and halogen atom.

In a particular embodiment, in formula (II), $R_2$ is selected from the group consisting of: $(C_1-C_{10})$alkyl, and 5-6 membered heteroaryl group or $R_2$ and $R_4$ together with the carbon atoms carrying them form a $(C_3-C_6)$cycloalkyl group; wherein said alkyl, cycloalkyl, and heteroaryl groups are optionally substituted, preferably by one or more substituent (s) selected from the group consisting of: $(C_1-C_{10})$alkyl and halogen atom.

In a particular embodiment, in formula (II), $R_2$ is selected from the group consisting of 5-6 membered heteroaryl groups, said heteroaryl groups being optionally substituted, preferably by one or more substituent(s) selected from the group consisting of: $(C_1-C_{10})$alkyl and halogen atom. In a particular embodiment, $R_2$ is a thienyl group.

In a particular embodiment, in formula (II), $R_2$ is selected from the group consisting of: $(C_1-C_{10})$alkyl and a thienyl ring or $R_2$ and $R_4$ together with the carbon atoms carrying them form a $(C_5-C_6)$cycloalkyl group such as a cyclohexyl group.

In a particular embodiment, in formula (II), $R_3$ is a $(C_6-C_{10})$aryl optionally substituted by one or more substituent(s) preferably selected from the group consisting of: $(C_1-C_{10})$alkyl and halogen atom.

In a particular embodiment, in formula (II), $R_4$ is selected from the group consisting of: H, —OH, —$NH_2$ and —C(O)OH or $R_2$ and $R_4$ together with the carbon atoms carrying them form a $(C_3-C_{10})$cycloalkyl group. In one embodiment, in formula (II), $R_4$ is H or $R_2$ and $R_4$ together with the carbon atoms carrying them form a $(C_5-C_6)$cycloalkyl group. Preferably, $R_4$ is H.

In a particular embodiment, in formula (II), $R_4$ is H or $R_2$ and $R_4$ together with the carbon atoms carrying them form a $(C_5-C_6)$cycloalkyl group.

In a particular embodiment, in formula (II), $R_1$ is a phenyl group and/or $R_2$ is a thienyl group, said phenyl and thienyl groups being optionally substituted.

In a particular embodiment, in formula (II), at least one of $R_1$ and $R_2$ is a $(C_6-C_{10})$aryl group or a 5-10 membered heteroaryl group.

In a particular embodiment, the EPAC1 inhibitors for the use according to the invention consist of compounds having the formula (II), wherein:

$R_1$ is selected from the group consisting of:
  $(C_2-C_{20})$alkyl;
  $(C_3-C_{10})$cycloalkyl;
  3-10 membered heterocycloalkyl;
  $(C_6-C_{10})$aryl; and
  5-10 membered heteroaryl;
wherein said alkyl, cycloalkyl, heterocycloalkyl, aryl and heteroaryl groups are optionally substituted; and
$R_2$ is selected from the group consisting of:
  H;
  $(C_1-C_{20})$alkyl;
  $(C_3-C_{10})$cycloalkyl;
  $(C_6-C_{10})$aryl; and
  5-10 membered heteroaryl;
or $R_2$ and $R_4$ together with the carbon atoms carrying them form a $(C_3-C_{10})$cycloalkyl group;
wherein said alkyl, cycloalkyl, aryl and heteroaryl groups are optionally substituted.

A preferred family of EPAC1 inhibitors for the use according to the invention consists of compounds having the following formula (III):

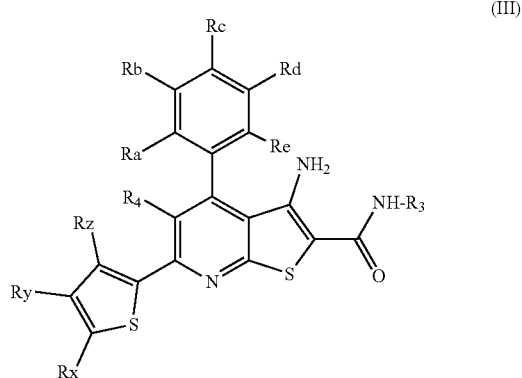

(III)

wherein:
  Ra, Rb, Rc, Rd, Re, Rx, Ry and Rz are selected among the group consisting of: H, —OH, halogen atom, —C(O)OH, $(C_1-C_{10})$alkyl, $(C_1-C_{10})$alkoxy, and —$NR_5R_6$, wherein $R_5$ and $R_6$ are independently of each other selected from $(C_1-C_{10})$alkyl or H;
  $R_4$ is selected from the group consisting of H, —OH, —$NH_2$ and —C(O)OH; and
  $R_3$ is as defined in formula (II) above.

In a particular embodiment, in formula (III), Ra, Rb, Rc, Rd, Re, Rx, Ry and Rz are selected among H, halogen atom or $(C_1-C_{10})$alkyl. In one embodiment, in formula (III), Rx, Ry and Rz are H and/or Ra, Rb, Rd and Re are H. Preferably, in formula (III), Rc is H or an halogen atom, for example a fluorine atom.

According to an embodiment, the EPAC1 inhibitors for the use according to the invention have one of the following formulae:

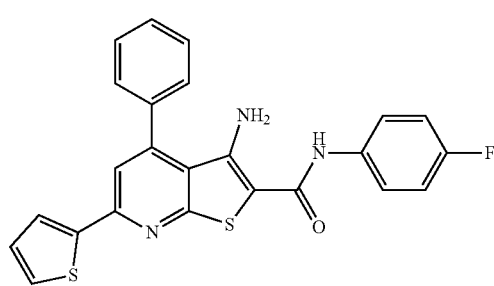

1

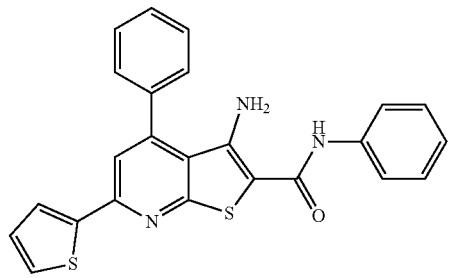

4

-continued

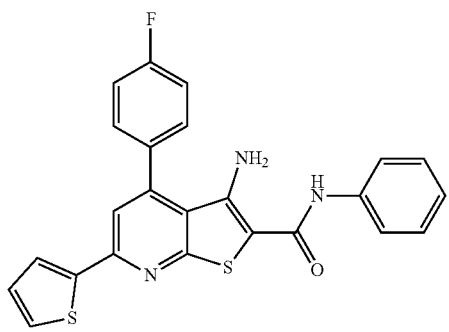

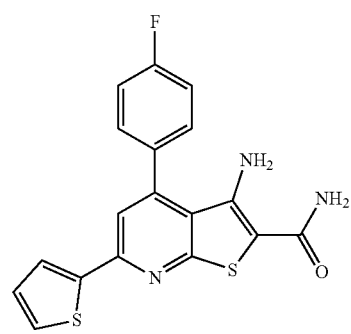

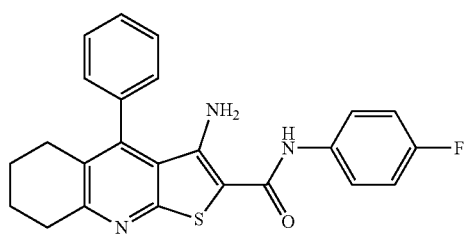

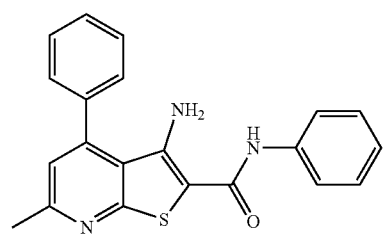

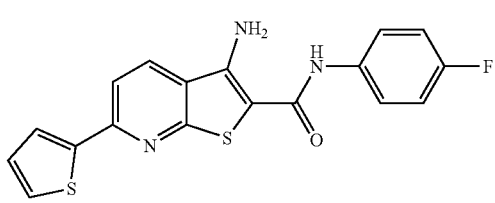

Preferably, the EPAC1 inhibitor for the use according to the invention has the following formula:

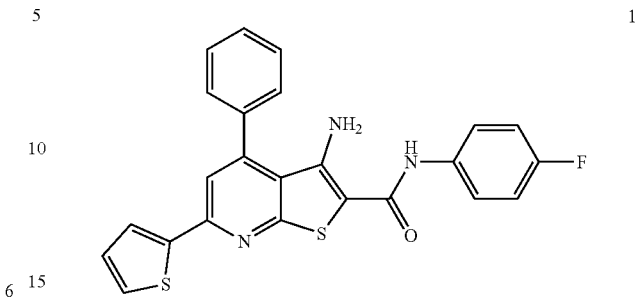

named herein AM-001.

The present invention also relates to the EPAC1 inhibitor for the use as defined above, wherein said EPAC1 inhibitor is combined with pirfenidone or nintedanib.

The present invention also relates to a method of prevention and/or treatment and/or reversion of idiopathic pulmonary fibrosis, said method comprising the administration of a pharmaceutical acceptable amount of an EPAC1 inhibitor to a patient in need thereof, said EPAC1 inhibitor being optionally combined with pirfenidone or nintedanib.

FIGURES

FIG. 1: Epac1 expression is elevated in pulmonary fibrosis. A) Epac1 mRNA expression level quantified by RTq-PCR (n=8 per group) in human non-IPF and IPF patients. B) and C) Epac1 mRNA and protein expression quantified by qRT-PCR (n=8 per group) and western blot (n=3 per group) in an experimental model of idiopathic pulmonary fibrosis induced by intratracheal instillation of bleomycin (4 U/Kg; 14 days). Data are presented as mean±SEM and the p-values were calculated using a t-test; *=p<0.05, *** P<0.001.

Figure 2:
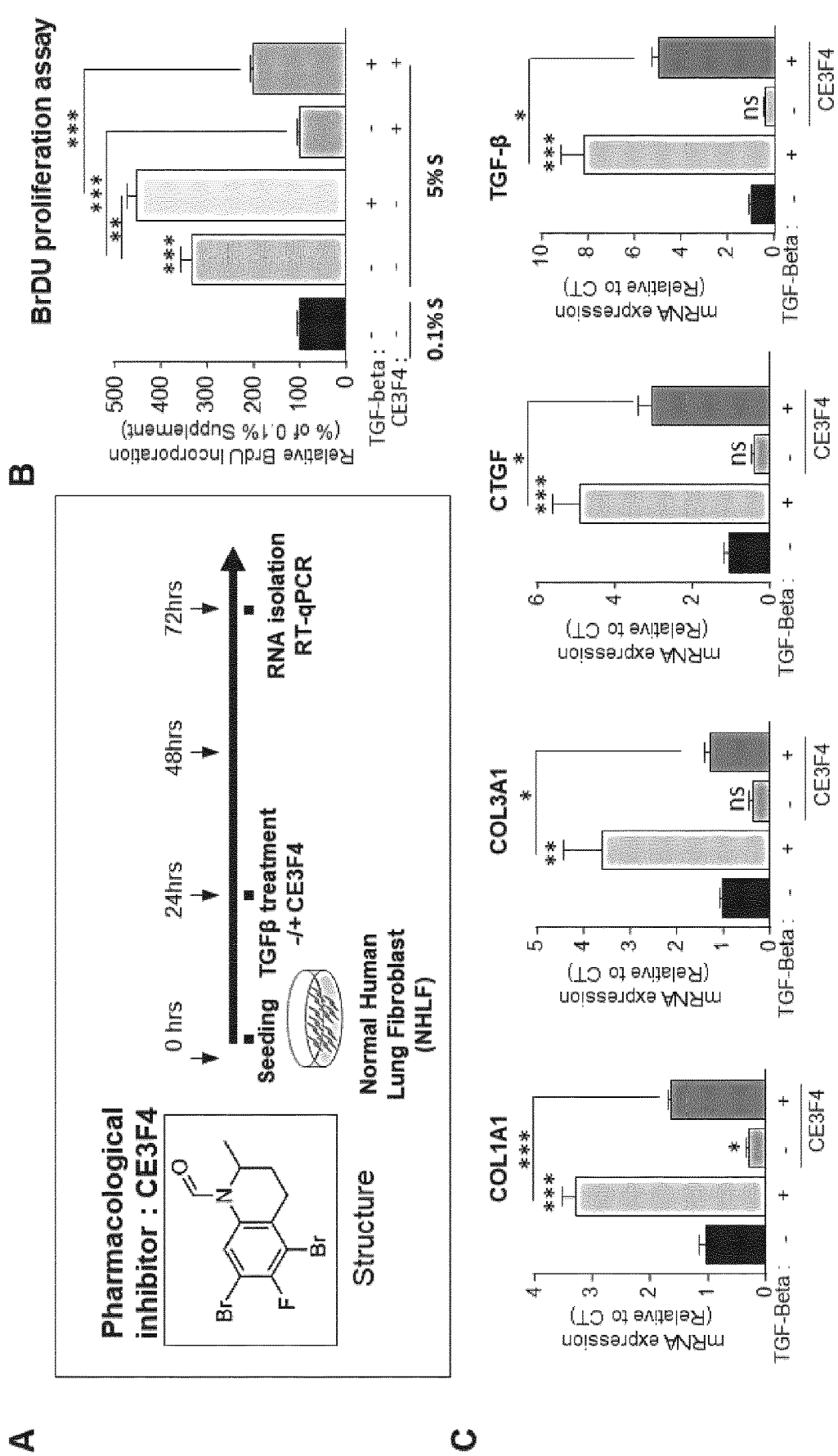

FIG. 2: CE3F4, a potent Epac1 inhibitor, significantly decreased fibroblasts proliferation and prevented the expression of fibrosis markers induced by TGF-β1. A) Schematic of the experimental design to study the role of the Epac1 inhibitor CE3F4 in Normal Human lung fibroblast (NHLF). B) Proliferation of NHLF cells was determined by labeling cells with BrdU assay. Relative proliferation under the specified conditions is shown (n=4). C) NHLF cells were treated with TGF-31 (2 ng/mL; 48 hrs) alone or in combination with Epac1 inhibitor CE3F4 (20 µM; 48 hrs). Fibrosis markers mRNA level of procollagen, type I, α1 [COL1], collagen type III [COL3], connective tissue growth factor [CTGF], transforming growth factor β [TGFβ]) were quantified by qPCR (n=3). Data are presented as mean±SEM and the p-values were calculated using a One-way Anova; ns=not significant, *=p<0.05, =p<0.01, and *=p<0.001.

Figure 3:
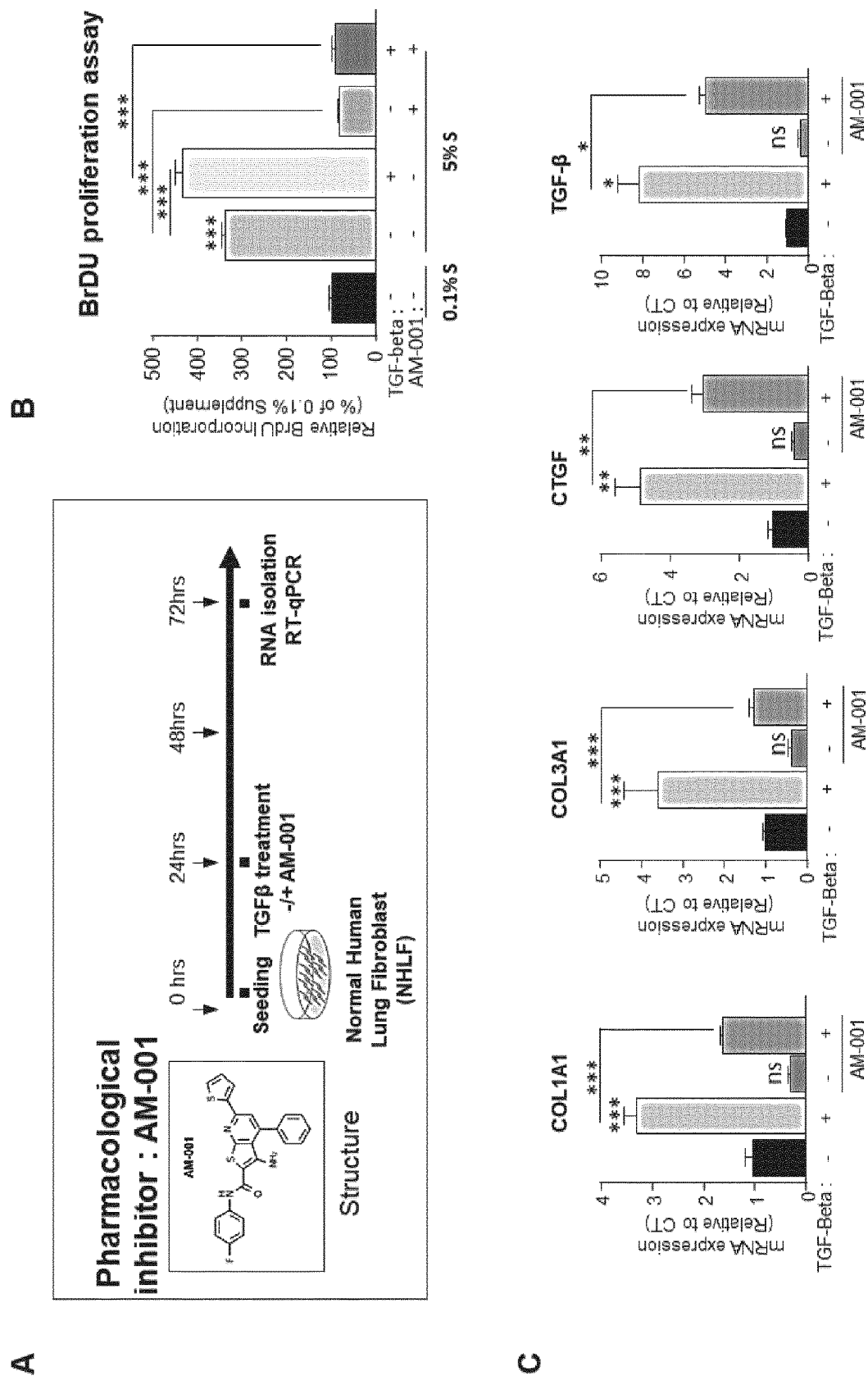

FIG. 3: AM-001, a new Epac1 selective inhibitor, blocked lung fibroblast proliferation and decreased the expression of fibrosis markers in NHLFs in vitro. A) Schematic representation of the experimental strategy to evaluate the role of AM-001 in normal human lung fibroblast. B) Proliferation was determined by labeling cells with BrdU assay. Relative proliferation under the specified conditions is shown (n=4). C) NHLF cells were treated with TGF-31 alone or in combination with AM-001 (20 µM; 48 hrs) and the mRNA level of fibrosis markers (procollagen, type I, α1 [COL1], collagen type III [COL3], connective tissue growth factor [CTGF] transforming growth factor β [TGFβ]) was quantified by qPCR (n=3). Data are presented as mean±SEM and the p-values were calculated using a One-way Anova; ns=not significant, *=p<0.05, =p<0.01, and *=p<0.001.

Figure 4:
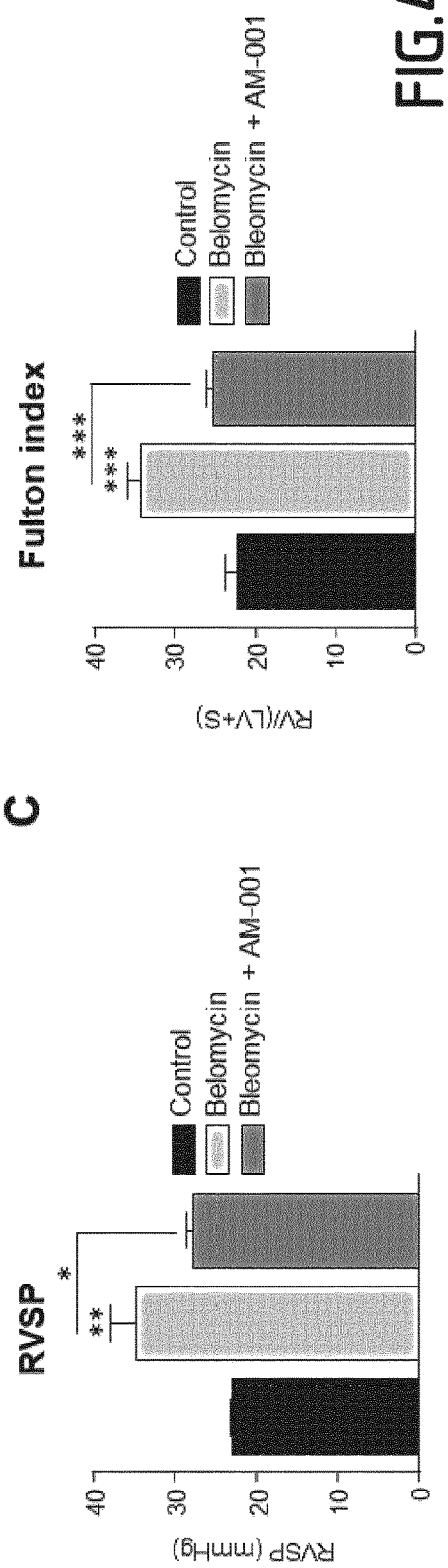

FIG. 4: A) Schematic of the experimental design to assess the therapeutic efficacy of the Epac1 inhibitor AM-001 in the mouse model of bleomycin-induced pulmonary fibrosis. B) Right ventricular systolic pressure (RVSP), and C) Right ventricular hypertrophy was assessed by the Fulton index (RV/(LV+septum) (n=3-7 per group). Data are presented as mean±SEM and the p-values were calculated using a One-way Anova; *=p<0.05, =p<0.01, and *=p<0.001.

Figure 5:
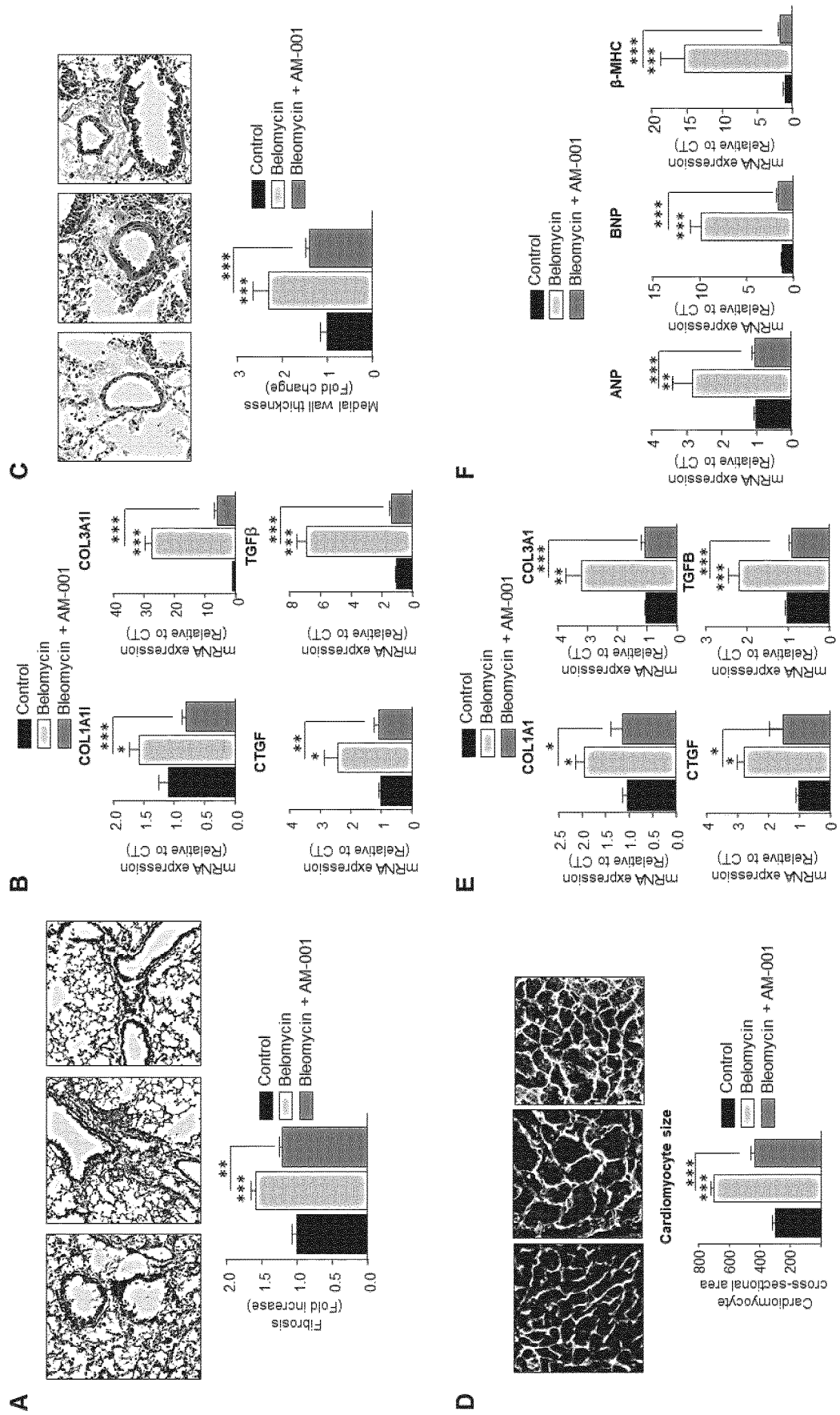

FIG. 5: Epac1 inhibitor AM-001 reduces lung fibrosis in bleomycin-induced pulmonary fibrosis in mice. A) Representative Masson's trichrome stained lung sections of indicated mice (Top panel). The graphs represent the quantification of fibrosis. B) Levels of fibrosis markers COL1, COL3, CTGF, and TGFβ were quantified by qPCR in the lung tissues (n=3-7 per group). C) Representative hematoxylin and eosin-stained lung sections (Top) and quantification of the medial thickness (Bottom) are shown (n=3-7 per group). D) RV sections were stained with fluorescence-tagged wheat germ agglutinin to examine RV cardiomyocyte cross-sectional area (Top) and quantification of cardiomyocyte cross-sectional area (Bottom). E) Fibrosis markers mRNA levels of COL1, COL3, CTGF, and TGFβ were quantified by qPCR in the RV tissues (n=3-7 per group). F) RV cardiac hypertrophy-related transcripts (atrial natriuretic factor [ANF], brain natriuretic peptide [BNP], β-myosin heavy chain [β-MHC]) mRNA levels assessed by qPCR.

Figure 6:
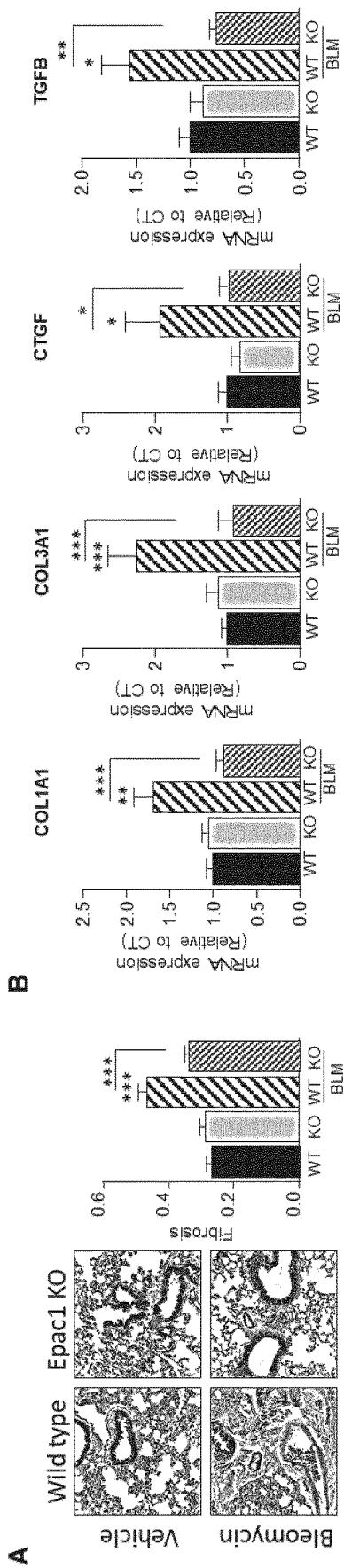

FIG. 6: Epac1−/− mice are protected against bleomycin-induced pulmonary fibrosis. A) Representative Masson's trichrome stained lung sections of indicated mice (left panel). The graphs represent the quantification of fibrosis (right panel). B) Levels of fibrosis markers COL1A1, COL3A1, CTGF, and TGFβ were quantified by qPCR in the lung tissues (n=3-7 per group). Data are presented as mean±SEM, and the p-values were calculated using a t-test or One-way Anova; *=p<0.05, =p<0.01, and *=p<0.001.

Figure 7:
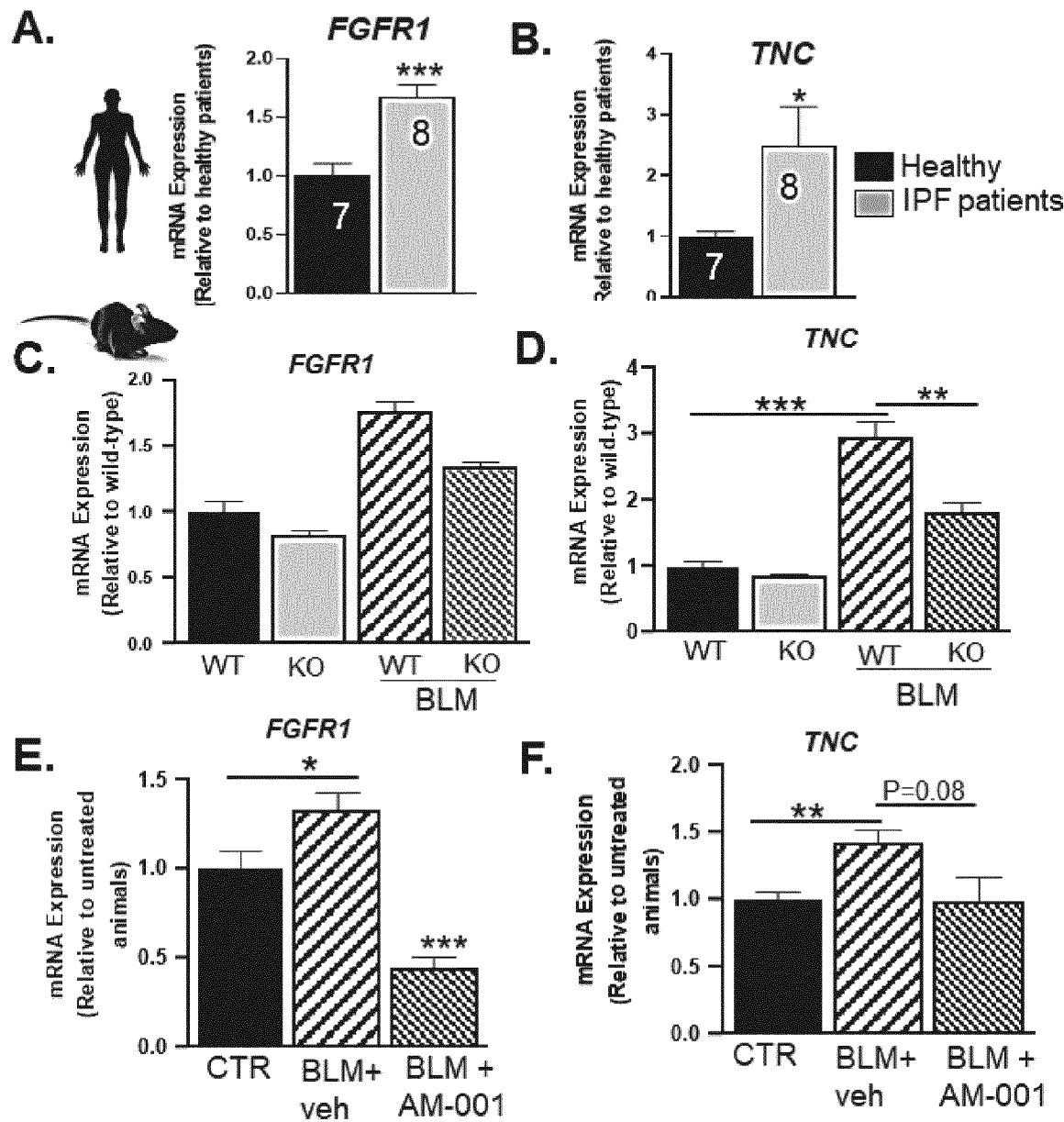

FIG. 7: Epac1 inhibition reduced FGFR1 and TNC expression. A-B) FGFR1 and TNC mRNA expression in RNA isolated from human lungs and C-D) BLM Epac1 KO challenged mice (28 days) compared to controls. E-F) FGFR1 and TNC mRNA level in BLM+vehicle vs. BLM+AM-001-treated mice (n=3-7/group). Data are presented as mean±SEM, and the p-values were calculated using a t-test or One-way Anova; *=p<0.05, =p<0.01, and *=p<0.001.

Figure 8:
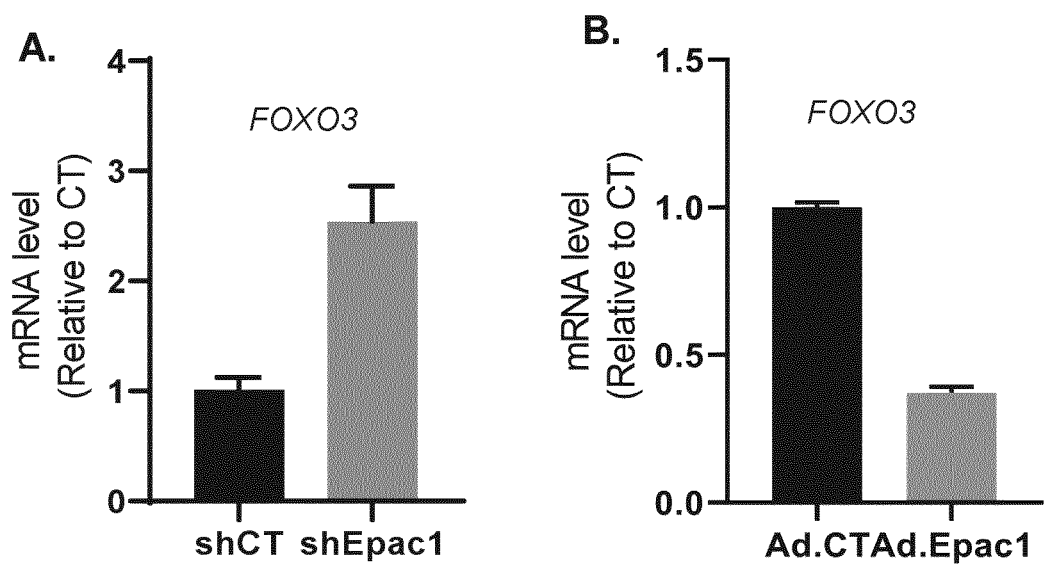

FIG. 8: FOXO3 transcription factor as a target of Epac1. A) FOXO3 mRNA expression in fibroblast following Epac1 silencing or (B) Ad.Epac overexpression in NHLF cells (n=3).

Figure 9:
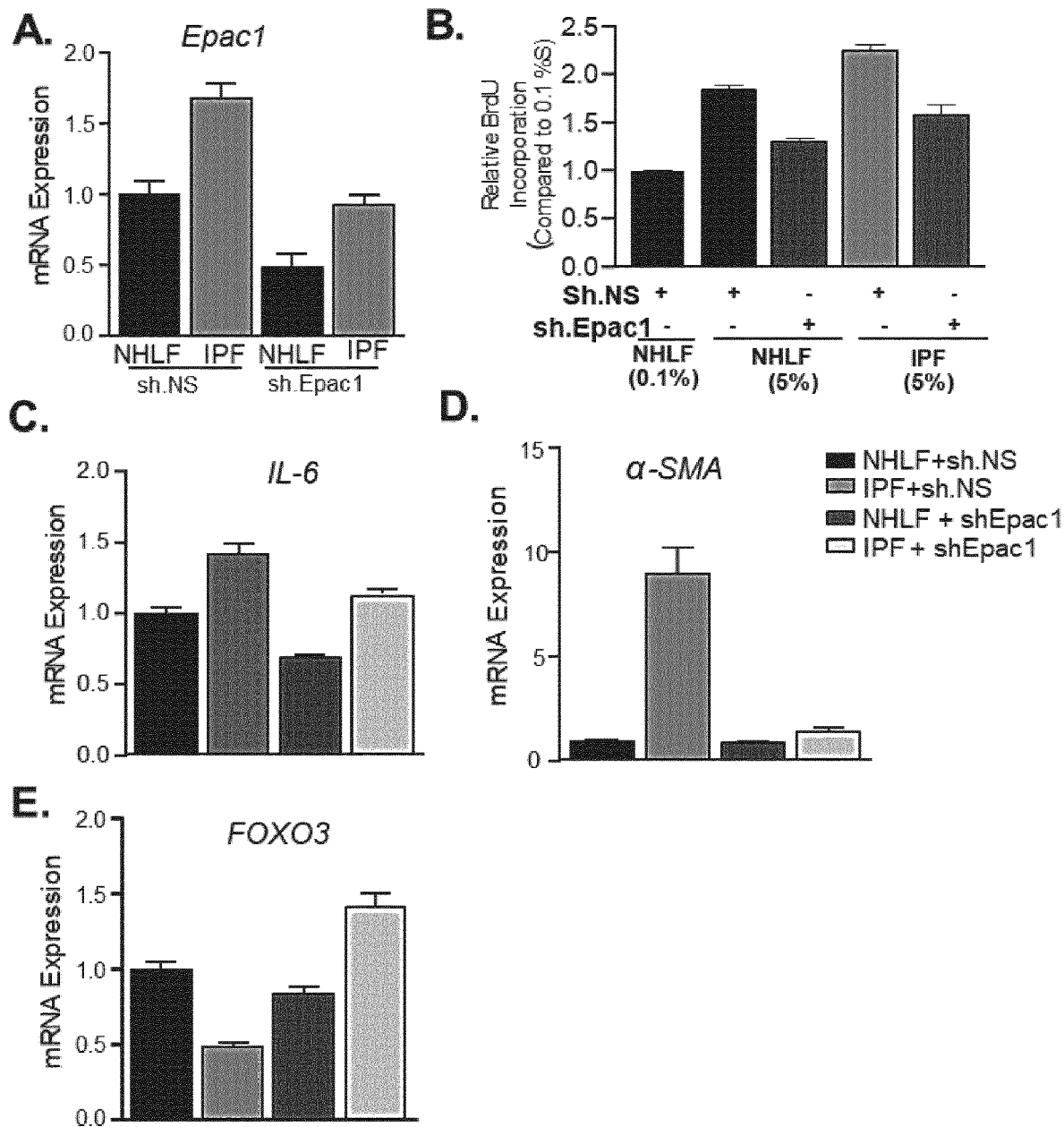

FIG. 9: Epac1 silencing reduced IPF fibroblast proliferation, IL-6, and SMA expression, and restores FOXO3. A) Epac1 mRNA expression in NHLF and IPF FB transfected with lenti.sh.Epac1 for 72 h. B) Proliferation of NHLF and IPF FB cells determined by BrdU assay in indicated conditions. C-E) IL-6, α-SMA, and FOXO3 mRNA expression (n=2).

Figure 10:
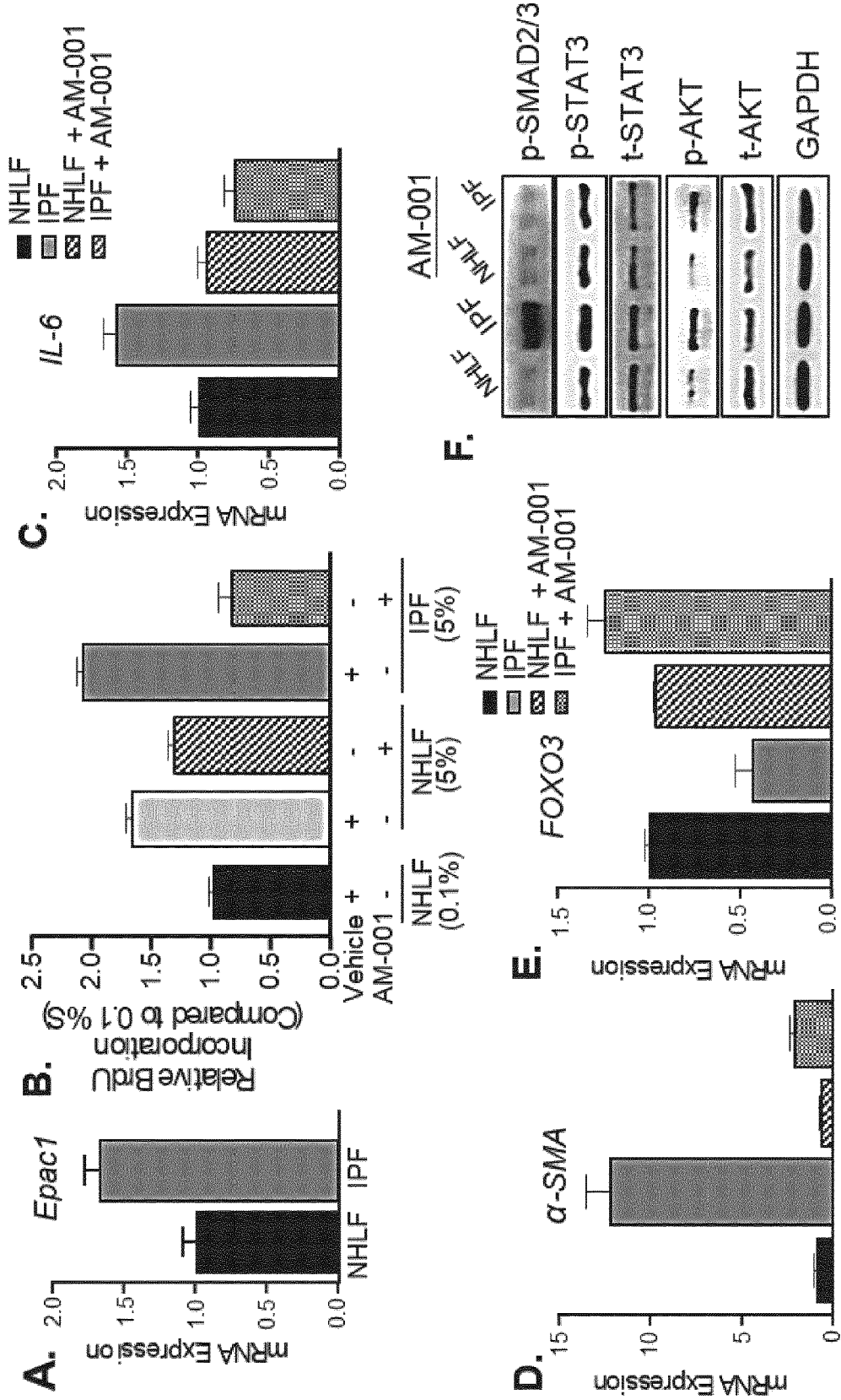

FIG. 10: AM-001 decreases IPF fibroblasts proliferation and reduced IL-6 and α-SMA expression. A) Epac1 mRNA expression in NHLF and IPF FB transfected with lenti.sh.Epac1 for 72 h. B) Proliferation of NHLF cells determined by BrdU assay in indicated conditions. C-E) The mRNA expression level of IL-6, α-SMA, and FOXO3 in NHLF and IPF fibroblasts treated with AM-001 (20 μM for 48 h, n=2). F). Representative immunoblot of indicated conditions in NHLF and IPF fibroblasts treated with AM-001.

EXAMPLES

BACKGROUND. Exchange protein directly activated by cAMP (Epac) is a PKA-independent signaling molecule activated by adrenergic stimulation (de Rooij et al., 1998, *Nature*, 396, 474-7; Kawasaki et al., 1998, *Science*, 282, 2275-9). Two isoforms have been identified, Epac1 and Epac2. Epac1 is expressed ubiquitously. The 2 EPAC isoforms, EPAC1 and EPAC2, are guanine-nucleotide exchange factors for the Ras-like GTPases, Rap1 and Rap2, which they activate independently of the classical effector of cAMP, protein kinase A. With the development of EPAC pharmacological modulators, many reports in the literature have demonstrated the critical role of EPAC in the regulation of various cardiovascular and renal diseases (Yang et al., 2013, *Am J Physiol Renal Physiol*, 304, F831-9; Laudette et al., 2018, *J Cardiovasc Dev Dis*, 5). Epac1-selective inhibitory compound has been investigated its potential properties in cardiovascular diseases (Fazal et al., 2017, *Circ Res*, 120, 645-657). AM-001 compound has been identified and characterized as a novel selective pharmacological inhibitor of Epac1. This small molecule is a thieno[2,3-b]pyridine derivative (3-amino-N-(4-fluorophenyl)-4-phenyl-6-(thiophen-2-yl)thieno[2,3-b]pyridine-2-carboxamide) which selectivity inhibits Epac1 catalytic activity. AM-001 displays cardioprotective properties against myocardial I/R injury and the detrimental effects of chronic β-AR activation (Laudette et al., 2019, *Cardiovasc Res*, 115, 1766-1777).

Materials and Methods

Patients. RNA, protein samples, and formalin-fixed paraffin-embedded sections of human IPF and healthy control donors were used in the present study. Human lung tissues were obtained from patients with IPF (n=8) who underwent surgery for organ transplantation program, and lung explant healthy control samples were obtained from the organ transplant program from the University General Consortium Hospital of Valencia (n=8). The samples were anonymous and archived specimens. The protocol was approved by the local research and independent ethics committee of the University General Consortium Hospital of Valencia (CEIC/2013). Informed written consent was obtained from each participant.

Animal. Mice were housed in a pathogen-free facility, and all animal experiments were approved by the Animal Care and Use Committees of the University of Toulouse. Epac1-deficient mice (Epac1−/−) have been engineered in the laboratory of Dr. Frank Lezoualc'h. Briefly, the Epac1 knock-out mice were generated by insertion of loxP sequences within introns 7 and 15 of the RAPGEF3 gene by Genoway. Desmin-Cre (C57BL/6 background) transgenic females that sporadically express the Cre recombinase in the oocyte were crossed with Epac1flox/flox (C57BL/6-SV129 background) males to generate Desmin-Cre-Epac1−/− and then Epac1−/− mice. Genotype was confirmed by PCR prior to use. In this study, 14 weeks old mice (C57BL/6 or C57BL/6-SV129 background for Epac1 knock-out and control littermates) were used.

Intratracheal bleomycin animal model. All of the animal experiments and handling were performed in accordance with NIH Guide for the Care and Use of Laboratory Animals. Animals were anesthetized by IP injection of xylazine/ketamine and were secured to a tray in the supine position. After intubation, the board was tilted at 45 degrees, and the IA-1C Microsprayer tip (PennCentury, Wyndmoor, PA) was inserted through the lumen of the angiocath. Animals were subjected to a single intratracheal injection of BLM (50 µL; 4 U/Kg) for 28 days. The pharmacological inhibitor of Epac1, AM-001, was injected intraperitoneally every alternate day (10 mg/kg) for 2 weeks.

Heart hemodynamic studies. The mice were anesthetized with (2-4%) isoflurane, intubated via tracheotomy, and mechanically ventilated with 1-2% isoflurane and oxygen (tidal volume, 6 mL/kg; respiratory rate, 100 breaths per minute). The thoracic cavity was opened, and the organs were accessed through a sternotomy. Once the pericardium was opened, and the heart was fully accessible, an ultrasonic flow probe (flow probe 2.5S176; Transonic Systems Inc., Ithaca, NY) was inserted into the RV to collect the right ventricular systolic pressure (RVSP). Hemodynamic data were recorded using a Scisense PV Control Unit (Scisense, Ontario, Canada).

Right Ventricular Weight Measurement. After the hemodynamic data were collected, the mice were harvested to collect the heart and lungs. The heart was removed from the chest and perfused with PBS to remove the blood and any clots. Both atria and connecting vessels were dissected out. Then, the RV was separated from the heart and weighed. Finally, the remaining left ventricle (LV) and septum were weighed. The Fulton Index was calculated by the weight ratio of the RV weight to the LV plus septum weight (RV weight/LV+Septum weight) to specifically illustrate the RV hypertrophy.

Hematoxylin & Eosin and Masson's trichrome staining. Lung tissue was harvested, inflated with PBS/OCT (50:50), and fixed (frozen in −80° C.) in OCT. Sections were cut to 8 µm and adhered to colorfrost glass slides (ThermoFisher). Lung tissue sections were stained with hematoxylin and eosin (H&E) and Masson's trichrome (Sigma-Aldrich) and visualized using light microscopy. The medial thickness and collagen deposition were then quantified using ImageJ software.

Wheat Germ Agglutinin (WGA) Immunostaining

RV sections were fixed in 1% paraformaldehyde (PFA) and stained using fluorescence-tagged wheat germ agglutinin (WGA) (Invitrogen) overnight at 4° C. and imaged with on Zeiss Observer Z.1 microscope (Carl Zeiss) at ×160 magnification. The outlines of cardiac myocytes were traced, and the cardiomyocyte area was calculated using ImageJ software.

Cell Culture. Normal human lung fibroblast (NHLF) and lung fibroblast from IPF patients were purchased from Lonza, Inc. (Allendale, NJ) and cultured as recommended in FGM-2 medium supplemented with 5% fetal bovine serum (FBS) in 5% $CO_2$ at 37° C. and passaged at the confluence. All the cell lines were tested by the manufacturers and negative for HIV-1, HBV, HCV, mycoplasma, bacteria, yeast, and fungi.

shRNA and lentivirus production. Epac1 shRNA (TRCN0000047228), cloned in the pLKO.1 lentiviral expression vector, was obtained from Dharmacon. For lentivirus production, the constructs and viral packaging plasmids pSPAX2 and pMD2.G were co-transfected into 293T cells using Effectene® (Qiagen) per the manufacturer's recommendations. The virus was concentrated by incubation with the Lenti-X Concentrator (Clontech) as recommended by the supplier. The concentrated virus particles were used to infect NHLF cells for 72 hrs. RNA and protein expression were respectively measured by RT-qPCR and immunoblotting to validate Epac1 knockdown.

Pharmacological treatment. Cells were seeded at 250,000 cells/well in 6-well plates and maintained in a 37° C. incubator with 5% CO2 for 24 hrs prior to use. Cells were treated with TGF-β1 (2 ng/mL; 48 hrs) alone or in combination with either Epac1 inhibitor CE3F4 (20 µM; 48 hrs) or AM-001 (20 µM; 48 hrs).

Cell Proliferation

The proliferation of NHLFs was measured by 5-bromo-2'-deoxyuridine (BrdU) incorporation using the Cell Proliferation ELISA, BrdU (colorimetric) assay (Roche, Indianapolis, IN), according to the manufacturer's instructions.

Total RNA Isolation, cDNA Preparation, and Quantitative RT-PCR Analysis

Total RNA was isolated using TRIzol™ (Invitrogen) and purified using RNeasy mini columns (Qiagen), according to the manufacturer's instructions. The cDNA synthesis kit (Applied Biosystems, Foster City, CA) was used to synthesized cDNA, as described by the manufacturer. Quantitative RT-PCR was performed using the PerfeCTa SYBR™ Green FastMix kit (Quantabio, Beverly, MA) and specific primers against the indicated genes, according to the manufacturer's instructions. Fold changes in gene expression were determined using the relative comparison method with normalization to GAPDH as an internal loading control.

SDS-PAGE and Immunoblot Analysis. Protein lysates were prepared using RIPA lysis buffer (Boston BioProducts) containing a Protease/Phosphatase Inhibitor Cocktail (Pierce). After centrifugation for 20 min at 15000×g, the protein concentrations were determined using a bicinchoninic acid (BCA) assay (Sigma-Aldrich). The proteins were then separated by SDS-polyacrylamide gel electrophoresis and transferred to polyvinylidene difluoride membranes. The membranes were blocked with 5% Skim milk and hybridized overnight at 4° C. with the following primary antibodies: Epac1 (Cell signaling), phospho-SMAD2/3 (Cell signaling), phospho-STAT3 (Cell signaling), phospho-AKT (Cell signaling), Total AKT (Cell signaling), and GAPDH (Thermofisher). The membranes were then incubated with the appropriate secondary HRP-conjugated antibody (Cell signaling) for 1 hour, and the blots were developed using the ECL System (Thermofisher).

Results

1. Increased expression of Epac1 in human IPF and in a mouse model of BLM-induced lung fibrosis. To determine the contribution of Epac proteins to the pathogenesis of IPF, Epac1, and Epac2 mRNA expression levels were measured in lung biopsies of patients diagnosed with IPF and normal lungs. We found a significantly increased expression of Epac1 mRNA, while Epac2 mRNA level remained in human pulmonary fibrosis lung tissues compared to healthy lung samples (FIG. 1A). In accordance with these findings, increased Epac1a mRNA and protein expression were found in lung samples from experimental mice model of PF induced by an intratracheal delivery of bleomycin (BLM) (FIG. 1B-C).

2. Selective pharmacological inhibition of Epac1 decreased the proliferation and prevented the expression of several fibrosis markers. To further investigate the role of Epac1a in pulmonary fibrosis, the effect of Epac1 inhibition was examined on the proliferation of normal human pulmonary fibroblasts (NHLFs) using a Bromodeoxyuridine (BrdU). NHLFs cells were treated for 48 hours with TGFβ alone or in combination with the Epac1 inhibitor CE3F4 using a media containing either 0.1% or 5% FBS (FIG. 2A). Pro-fibrotic agent TGFβ1 is an important mediator of fibrosis and is thought to contribute to the pathogenesis of IPF (Fernandez et al., 2012). TGFβ treatment and serum stimulation increased the proliferation of NHLFs, whereas the CE3F4 treatment significantly decreased this response (FIG. 2B). The inventors further sought to determine whether Epac1 inhibition regulates the expression of several TGFβ1-regulated genes in vitro. Therefore, NHLFs cells were treated with TGFβ1 for 48 hours alone or in combination with the CE3F4 compound. Then the mRNA expression of several fibrosis markers such as Collagen IA (COLIA1), COLIII, and connective tissue growth factor (CTGF) and Transforming growth factor-beta (TGFβ1) was analyzed. Remarkably, Epac1 inhibition by the CE3F4 compound impaired the induction of fibrosis marker induced by TGFβ treatment (FIG. 2C).

3. AM-001, a new Epac1 selective inhibitor, blocked lung fibroblast proliferation and decreased the expression of fibrosis markers in NHLFs in vitro. CE3F4 was identified as a selective pharmacological inhibitor of Epac1 in vitro, but its low biodisponibility prevents its use for future in vivo applications. Therefore, the inventors investigated the effects of AM-001, a new Epac1-selective inhibitory compound, named AM-001, on the proliferation of NHLFs and the expression of fibrosis markers in vitro. Indeed, the small molecule AM-001 is a thieno[2,3-b]pyridine derivative (3-amino-N-(4-fluorophenyl)-4-phenyl-6-(thiophen-2-yl)thieno[2,3-b] pyridine-2-carboxamide) and showed selective inhibitory activity toward Epac1 as no antagonist effect on Epac2 or protein kinase A (PKA) activity has been reported (Laudette et al., Cardiovasc. Res. 2019, 115 (12):1766-1777). This newly characterized and identified compound has shown promising cardioprotective properties in pre-clinical studies against myocardial I/R injury and pathological cardiac remodeling during chronic β-AR activation. Similarly to the previous experiments performed in presence of CE3F4, NHLFs cells were treated for 48 hours with TGFβ alone or in combination with the new Epac1 inhibitor AM-001 using a media containing either 0.1% or 5% FBS (FIG. 3A). Our results showed that AM-001 inhibited NHLFs proliferation induced by the high serum or TGFβ stimulation (FIG. 3B). Consistent with the previous results, AM-001 impaired the upregulation of the fibrosis gene markers induced by TGFβ in vitro (FIG. 3C).

4. Pharmacological inhibition of Epac1 as a new therapeutic strategy to inhibit lung fibrosis and lung dysfunction in the Bleomycin-induced PF mouse model. To further confirm the implication of Epac1 upregulation in the lung fibrosis pathogenesis, the potential therapeutic effect of Epac1 inhibition was next evaluated in vivo using the Epac1-selective inhibitory compound, AM-001 (Laudette et al., Cardiovasc. Res. 2019, 115(12):1766-1777). BLM murine model is frequently used to induce pulmonary fibrosis and remain the most commonly used animal model in rodents to study interstitial lung disease (Liu et al., 2017, *Methods Mol Biol*, 1627, 27-42; Leach et al., 2013, *Am J Respir Cell Mol Biol*, 49, 1093-101). The BLM aerosolization challenge provokes lung injury with a subsequent fibroproliferative response in mouse by inducing an increase in production of reactive oxygen species, thereby causing cellular damage to endothelial cells and other cell types, leading to the production of cytokines and pro-fibrotic mediators such as TGFβ and IL-6 (Adamson, 1976, *Environ Health Perspect*, 16, 119-26; Yamamoto and Nishioka, 2005, *Exp Dermatol*, 14, 81-95; Leach et al., 2013).

Using a therapeutic strategy, mice were randomly allocated to a sham control-treated group that received intratracheal saline and PF group that received a single intratracheal aerosolization of BLM (4 U/kg). After 2 weeks, the BLM-challenged group was randomly assigned to receive either a vehicle or the Epac1 inhibitor AM-001 for two weeks (FIG. 4A). Vehicle or AM-001 was injected intraperitoneally every alternate day (10 mg/kg) for 2 weeks. Interestingly, we noticed a reduction in right ventricular systolic pressure (RVSP) in the AM-001-treated group compared to the control group (FIG. 4B). In addition, our results also showed that the AM-001 treatment significantly decreased RV hypertrophy in the BLM-challenged mice, as revealed by a decreased Fulton Index (FIG. 4C).

5. AM-001 effectively reverses pulmonary interstitial fibrosis and vascular remodeling. To further investigate the potential therapeutic effect of Epac1 inhibition in PF, the interstitial fibrosis level and the vascular remodeling were next evaluated by histological analysis after 2 weeks of treatment. The results demonstrated that both interstitial and perivascular fibrosis were increased in response to the bleomycin instillation and resulted in substantial histological tissue damage in the Vehicle-treated group compared to the AM-001-treated group (FIG. 5A). Interestingly, these results showed that both interstitial and perivascular fibrosis was increased in the vehicle-control group and significantly decreased by AM-001-treated BLM group (FIG. 5A). The inventors also measured by RT-qPCR the expression of several markers of fibrosis in the lung samples. It was found that Epac1 inhibition markedly reduced the expression of COLI, COLIII, CTGF, and TGFβ mRNA levels in lung samples (FIG. 5B). In addition, morphometric analysis of distal pulmonary arteries demonstrated a significant increase of medial thickness in BLM-treated mice (FIG. 5C). Similarly, AM-001 markedly diminished pulmonary vascular remodeling in comparison with the vehicle-treated BLM mice group (FIG. 5C). Histological analysis showed a reduction in cardiomyocyte size in RV when treated with the Epac1 inhibitor AM-001 (FIG. 5D). In addition, upregulation of the expression of fibrosis and hypertrophic gene markers such as atrial natriuretic peptide (ANP), brain natriuretic peptide (BNP), beta-myosin heavy chain (β-MHC), were compromised in AM-001-treated mice (FIG. 5E).

Altogether, these pre-clinical data elicited that pharmacological inhibition of Epac1 significantly inhibits lung fibrosis, vascular remodeling, and RV hypertrophy while improving hemodynamics parameters in the bleomycin-induced IPF model. Collectively, the in vitro and in vivo results further confirm that the pharmacological inhibition of Epac1 represents a promising therapeutic strategy for treating patients with pulmonary fibrosis.

6. Epac1 deficiency protects mice from BLM-induced fibrosis. The inventors sought to address the impact of Epac1 deletion on PF. Global Epac1 KO young mice (gift from Dr. Lezoualch) and WT mice were randomly allocated to two groups; uninjured control saline group (n=10) and BLM group (n=10) that were subjected to a single intratracheal injection of BLM (4 U/Kg) for 28 days. Remarkably, 28 days after BLM, the fibrosis lesions assessed by Masson Trichrome staining were significantly decreased in Epac1 KO mice compared to WT BLM-challenged mice (FIG. 6A). Consistently, it was found that the mRNA level of fibrotic markers, such as procollagen, type I, α1 [COL1A1], collagen type III [COL3A1], connective tissue growth factor [CTGF], transforming growth factor β [TGFβ]) were significantly reduced in BLM Epac KO mice (FIG. 6B). These data suggest that Epac1 is necessary for the development of lung fibrosis, and its deletion is sufficient to result in marked protection from fibrosis.

7. RNA-Seq identifies Epac1 target genes involved in major fibrotic pathways. To globally identify targets of Epac1, RNA-Seq was performed in NHLF treated either with DMSO or with 20 µM of AM-001 (Epac1 inhibitor) for 48 h. Our preliminary results dataset analysis in control and AM-001 treated-NHLF cells identified key IPF gene signatures involved in fibrosis, ECM remodeling, and growth during lung injury.

From this broad dataset, TGFβ signaling, FGFR1 (Fibroblast Growth Factor receptor 1), and TNC (Tenascin C) were chosen as candidate genes. TGF-β is a regulator of the FGF/FGFR signaling cascade in human lung fibroblasts[1,2], demonstrating the complex interactions among many growth factors. It also upregulated TNC[3-5]. Collectively, this evidence suggests an important role for Epac1 in lung fibrosis disease mechanism. FGFR1 and TNC are established lung fibrosis triggers[5,6], and both are upregulated in our human lung samples (FIG. 7A-B). The inventors also validated the RNA seq results in Epac1 KO mice. The data showed that BLM significantly increased FGFR1 and TNC mRNA levels in challenged WT mice compared to Epac1 KO (FIG. 7C-D). Interestingly, AM-001 treatment reversed BLM effects by significantly decreasing FGFR1, with a trend decrease in TNC mRNA in WT mice (FIG. 7E-F). The inventors further analyzed the RNA-Seq dataset obtained using AM-001 treated-NHLF to identify the top 50 transcription factors (TFs) using the ENCODE and ChEA libraries. The inventors identified Forkhead Box O3 (FOXO3) as a potential candidate. Forkhead box Os (FOXOs) are evolutionarily conserved TFs, targets of the PI3-kinase/Protein kinase B-AKT signaling pathway, and implicated in an array of fundamental biological processes.

Studies have shown that the loss of FOXO3 leads to lung fibroblasts trans-differentiation and hyperproliferation phenotype[7,8]. Moreover, FOXO3 KO mice displayed enhanced susceptibility to BLM challenge, increased fibrosis, loss of lung function, and higher mortality[7]. Remarkably, it was found that shRNA-mediated Epac1 silencing potentiates FOXO3 mRNA expression while Epac1 overexpression reverses these effects in NHLF cells (FIG. 8A-B).

8. Effect of Epac1 loss-or-gain-of-function in normal and IPF fibroblasts. Epac1 depleted IPF fibroblasts or treated with AM-001 have been assessed for proliferation in basal condition using BrdU incorporation assays[22]. The preliminary data demonstrate that IPF fibroblasts (FB) display a high mRNA level of Epac1 compared to NHLF in basal condition, and both Epac1 knockdown (FIG. 9A) and AM-001 inhibition decrease IPF fibroblasts proliferation (FIG. 9B-10B). Epac1 has emerged as an essential regulator of the pro-inflammatory IL-6 signaling pathways[9,10]. The depletion or inhibition of Epac1 in IPF fibroblasts attenuates IL-6 and α-SMA and restored FOXO3 mRNA expression (FIGS. 9C-E & 10C-E). Moreover, the phosphorylation of SMAD2/3, STAT3, and AKT was decreased in AM-001 treated IPF fibroblast (FIG. 10E). AM-001 appears to target TGF-β1 signaling, AKT, and IL-6.

In summary, these data provide preliminary evidence of the possibility of Epac1 as a critical player in lung profibrotic gene expression and fibroblasts activation and growth in PF. Thus, Epac1 might be a potential therapeutic target for the development of AM-001 as a novel anti-fibrosis agent for PF.

REFERENCES

1. Shirakihara T, Horiguchi K, Miyazawa K, Ehata S, Shibata T, Morita I, Miyazono K and Saitoh M. TGF-beta regulates isoform switching of FGF receptors and epithelial-mesenchymal transition. *EMBO J.* 2011; 30:783-95.
2. Khalil N, Xu Y D, O'Connor R and Duronio V. Proliferation of pulmonary interstitial fibroblasts is mediated by transforming growth factor-beta1-induced release of extracellular fibroblast growth factor-2 and phosphorylation of p38 MAPK and JNK. *J Biol Chem.* 2005; 280:43000-9.
3. Jinnin M, Ihn H, Asano Y, Yamane K, Trojanowska M and Tamaki K.
   Tenascin-C upregulation by transforming growth factor-beta in human dermal fibroblasts involves Smad3, Sp1, and Ets1. *Oncogene.* 2004; 23:1656-67.
4. Estany S, Vicens-Zygmunt V, Llatjos R, Montes A, Penin R, Escobar I, Xaubet A, Santos S, Manresa F, Dorca J and Molina-Molina M. Lung fibrotic tenascin-C upregulation is associated with other extracellular matrix proteins and induced by TGFbeta1. *BMC Pulm Med.* 2014; 14:120.
5. Bhattacharyya S, Wang W, Morales-Nebreda L, Feng G, Wu M, Zhou X, Lafyatis R, Lee J, Hinchcliff M, Feghali-Bostwick C, Lakota K, Budinger G R, Raparia K, Tamaki Z and Varga J. Tenascin-C drives persistence of organ fibrosis. *Nat Commun.* 2016; 7:11703.
6. MacKenzie B, Korfei M, Henneke I, Sibinska Z, Tian X, Hezel S, Dilai S, Wasnick R, Schneider B, Wilhelm J, El Agha E, Klepetko W, Seeger W, Schermuly R, Gunther A and Bellusci S. Increased FGF1-FGFRc expression in idiopathic pulmonary fibrosis. *Respir Res.* 2015; 16:83.
7. A l-Tamari H M, Dabral S, Schmall A, Sarvari P, Ruppert C, Paik J, DePinho R A, Grimminger F, Eickelberg O, Guenther A, Seeger W, Savai R and Pullamsetti S S. FoxO3 an important player in fibrogenesis and therapeutic target for idiopathic pulmonary fibrosis. *EMBO Mol Med.* 2018; 10:276-293.
8. Nho R S, Hergert P, Kahm J, Jessurun J and Henke C. Pathological alteration of FoxO3a activity promotes idiopathic pulmonary fibrosis fibroblast proliferation on type i collagen matrix. *Am J Pathol.* 2011; 179:2420-30.
9. Mediero A, Perez-Aso M and Cronstein B N. Activation of EPAC1/2 is essential for osteoclast formation by modulating NFkappaB nuclear translocation and actin cytoskeleton rearrangements. *FASEB J.* 2014; 28:4901-13.
10. Parnell E, Smith B O, Palmer T M, Terrin A, Zaccolo M and Yarwood S J. Regulation of the inflammatory response of vascular endothelial cells by EPAC1. *Br J Pharmacol.* 2012; 166:434-46.

The invention claimed is:

1. A method of treatment and/or reversion of idiopathic pulmonary fibrosis, said method comprising the administration of a pharmaceutical acceptable amount of an EPAC1 inhibitor to a patient in need thereof, wherein the EPAC1 inhibitor has:
the following formula (I):

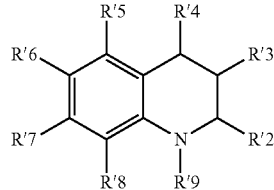

wherein:
R'9 is H or

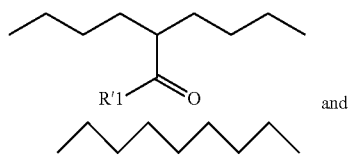

is the attachment to the nitrogen atom of the tetrahydroquinoline;
R'1, R'2, R'3, R'4, and R'8 are independently chosen from the group consisting of: H, $(C_1-C_{10})$alkyl, $(C_3-C_{10})$cycloalkyl, $(C_6-C_{10})$aryl, $(C_1-C_6)$alkylene-$(C_6-C_{10})$aryl and $(C_3-C_{10})$heteroaryl, said aryl and heteroaryl groups being possibly substituted by at least one substituent chosen from: OH, $NH_2$, $NO_2$, $(C_1-C_6)$alkyl, and halogen;
R'5 is an halogen atom;
R'6 and R'7 are independently chosen from the group consisting of: H and halogen atoms;
or its pharmaceutically acceptable salts, racemates, diastereomers or enantiomers,
the compound of formula (I) being different from the following compound:

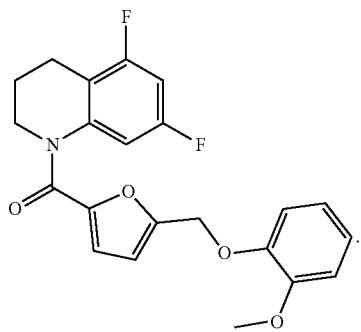 [SMILES: COc1ccccc1OCc1ccc(C(=O)N2CCCc3c(F)cc(F)cc32)o1]

the following formula (II):

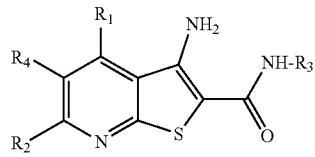

wherein:
R₁ is selected from the group consisting of:
$(C_2-C_{20})$alkyl;
$(C_3-C_{10})$cycloalkyl;
3-10 membered heterocycloalkyl;
$(C_6-C_{10})$aryl; and
5-10 membered heteroaryl;
wherein said alkyl, cycloalkyl, heterocycloalkyl, aryl and heteroaryl groups are optionally substituted by one or more substituent(s) selected from the group consisting of: —OH, halogen atom, —C(O)OH, —$(C_1-C_{10})$alkyl, —$(C_1-C_{10})$alkoxy, and —$NR_7R_8$ group, wherein $R_7$ and $R_8$ are independently of each other selected from $(C_1-C_{10})$alkyl and H;
R₂ is selected from the group consisting of:
H;
$(C_1-C_{20})$alkyl;
$(C_3-C_{10})$cycloalkyl;
$(C_6-C_{10})$aryl; and
5-10 membered heteroaryl;
or R₂ and R₄ together with the carbon atoms carrying them form a $(C_3-C_{10})$cycloalkyl group;
wherein said alkyl, cycloalkyl, heterocycloalkyl, aryl and heteroaryl groups are optionally substituted by one or more substituent(s) selected from the group consisting of: —OH, halogen atom, —C(O)OH, —$(C_1-C_{10})$alkyl, —$(C_1-C_{10})$alkoxy, and —$NR_7R_8$ group, wherein $R_7$ and $R_8$ are independently of each other selected from $(C_1-C_{10})$alkyl and H;
R₃ is selected from the group consisting of:
$(C_3-C_{10})$cycloalkyl;
3-10 membered heterocycloalkyl;
$(C_6-C_{10})$aryl; and
5-10 membered heteroaryl;
wherein said cycloalkyl, heterocycloalkyl, aryl and heteroaryl groups are optionally substituted by one or more substituent(s) selected from the group consisting of: —OH, halogen atom, —C(O)OH, —$(C_1-C_{10})$alkyl, —$(C_1-C_{10})$alkoxy, and —$NR_7R_8$ group, wherein $R_7$ and $R_8$ are independently of each other selected from $(C_1-C_{10})$alkyl and H; and
R₄ is selected from the group consisting of: H, —OH, —NRxRy and —C(O)ORz, Rx, Ry and Rz being independently of each other H or a $(C_1-C_{10})$alkyl;
or R₂ and R₄ together with the carbon atoms carrying them form a $(C_3-C_{10})$cycloalkyl group;
or its pharmaceutically acceptable salt, racemate, diastereomer or enantiomer.

2. The method according to claim 1, wherein, in formula (I), R'9 is H.

3. The method according to claim 1, said EPAC1 inhibitor having the following formula:

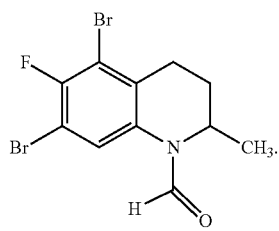

4. The method according to claim 1, wherein, in formula (II), $R_1$ is selected from the group consisting of:
- $(C_6-C_{10})$aryl; and
- 5-10 membered heteroaryl;

wherein said aryl and heteroaryl groups are optionally substituted by one or more substituent(s) selected from the group consisting of —$NR_7R_8$, $(C_1-C_{10})$alkyl and halogen atom; wherein $R_7$ and $R_8$ are independently of each other selected from $(C_1-C_{10})$alkyl or H.

5. The method according to claim 1, wherein, in formula (II), $R_2$ is selected from the group consisting of:
- H;
- $(C_1-C_{20})$alkyl;
- $(C_6-C_{10})$aryl; and
- 5-10 membered heteroaryl;

or $R_2$ and $R_4$ together with the carbon atoms carrying them form a $(C_3-C_{10})$cycloalkyl group;

wherein said alkyl, cycloalkyl, aryl and heteroaryl groups are optionally substituted by one or more substituent(s) selected from the group consisting of: $(C_1-C_{10})$alkyl and halogen atom.

6. The method according to claim 1, wherein, in formula (II), $R_3$ is a $(C_6-C_{10})$aryl optionally substituted by one or more substituent(s) selected from the group consisting of: —OH, halogen atom, —C(O)OH, —$(C_1-C_{10})$alkyl, —$(C_1-C_{10})$alkoxy, and —$NR_7R_8$ group, wherein $R_7$ and $R_8$ are independently of each other selected from $(C_1-C_{10})$alkyl and H.

7. The method according claim 1, wherein, in formula (II), $R_4$ is H or $R_2$ and $R_4$ together with the carbon atoms carrying them form a $(C_5-C_6)$cycloalkyl group.

8. The method according to claim 1, wherein, in formula (II), $R_1$ is a phenyl group and/or $R_2$ is a thienyl group, said phenyl and thienyl groups being optionally substituted by one or more substituent(s) selected from the group consisting of: —OH, halogen atom, —C(O)OH, —$(C_1-C_{10})$alkyl, —$(C_1-C_{10})$alkoxy, and —$NR_7R_8$ group, wherein $R_7$ and $R_8$ are independently of each other selected from $(C_1-C_{10})$alkyl and H.

9. The method according to claim 1, wherein the EPAC1 inhibitor has the following formula (III):

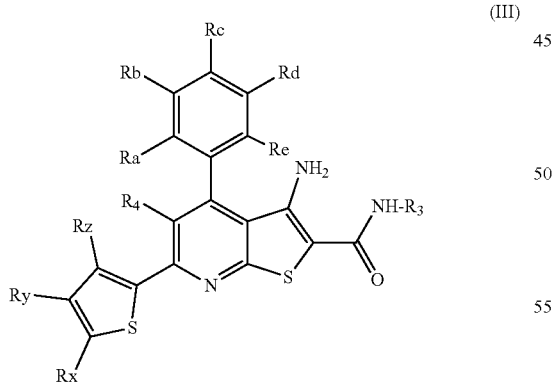

wherein Ra, Rb, Rc, Rd, Re, Rx, Ry and Rz are selected among the group consisting of: H, —OH, halogen atom, —C(O)OH, $(C_1-C_{10})$alkyl, $(C_1-C_{10})$alkoxy, and —$NR_5R_6$, wherein $R_5$ and $R_6$ are independently of each other selected from $(C_1-C_{10})$alkyl or H;

$R_4$ is selected from the group consisting of H, —OH, —$NH_2$ and —C(O)OH; and $R_3$ is selected from the group consisting of:
- $(C_3-C_{10})$cycloalkyl;
- 3-10 membered heterocycloalkyl;
- $(C_6-C_{10})$aryl; and
- 5-10 membered heteroaryl;

wherein said cycloalkyl, heterocycloalkyl, aryl and heteroaryl groups are optionally substituted by one or more substituent(s) selected from the group consisting of: —OH, halogen atom, —C(O)OH, —$(C_1-C_{10})$alkyl, —$(C_1-C_{10})$alkoxy, and —$NR_7R_8$ group, wherein $R_7$ and $R_8$ are independently of each other selected from $(C_1-C_{10})$alkyl and H.

10. The method according to claim 1, wherein the EPAC1 inhibitor has one of the following formulae:

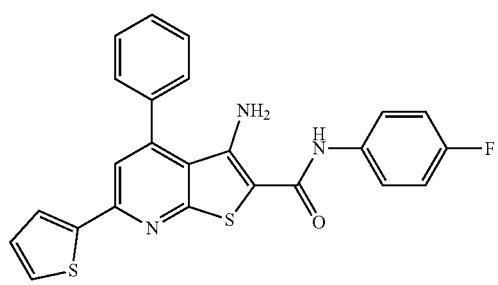

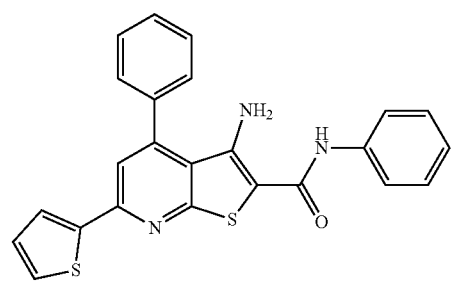

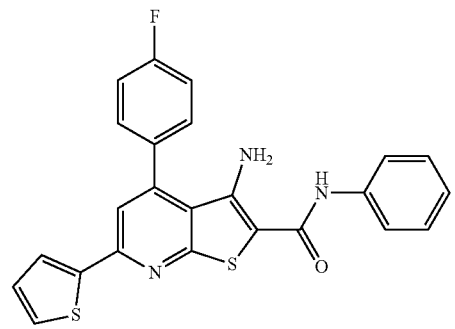

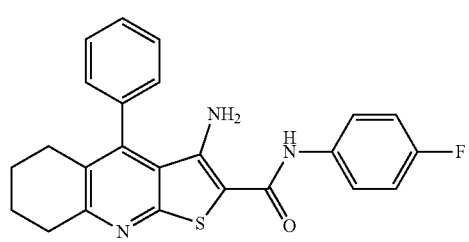

-continued

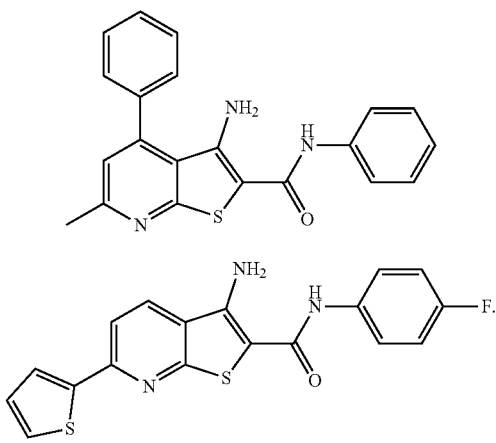

11. The method according to claim 1, wherein the EPAC1 inhibitor has the following formula:

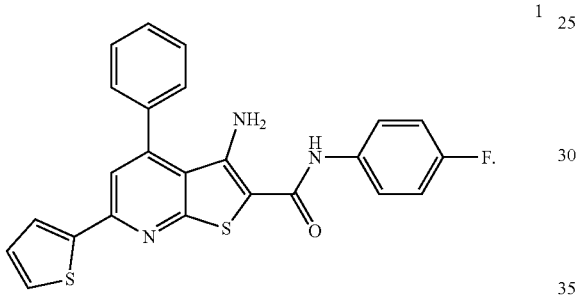

12. A method of treatment and/or reversion of idiopathic pulmonary fibrosis, said method comprising the administration of a pharmaceutical acceptable amount of an EPAC1 inhibitor to a patient in need thereof, said EPAC1 inhibitor being combined with pirfenidone or nintedanib, wherein the EPAC1 inhibitor has:
the following formula (I):

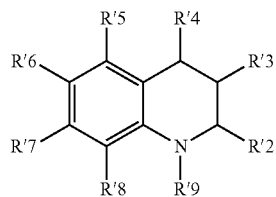

wherein:
R'9 is H or

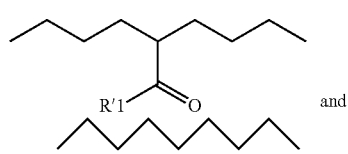

and is the attachment to the nitrogen atom of the tetrahydroquinoline;

R'1, R'2, R'3, R'4, and R'8 are independently chosen from the group consisting of: H, $(C_1-C_{10})$alkyl, $(C_3-C_{10})$cycloalkyl, $(C_6-C_{10})$aryl, $(C_1-C_6)$alkylene-$(C_6-C_{10})$aryl and $(C_3-C_{10})$heteroaryl, said aryl and heteroaryl groups being possibly substituted by at least one substituent chosen from: OH, $NH_2$, $NO_2$, $(C_1-C_6)$alkyl, and halogen;

R'5 is an halogen atom;

R'6 and R'7 are independently chosen from the group consisting of: H and halogen atoms;

or its pharmaceutically acceptable salts, racemates, diastereomers or enantiomers, the compound of formula (I) being different from the following compound:

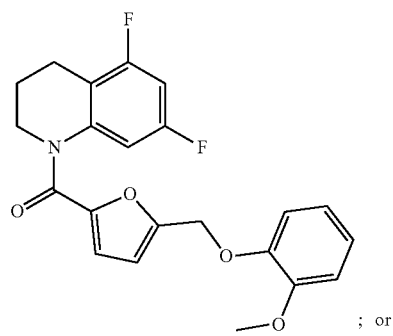

; or the following formula (II):

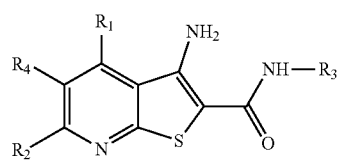

wherein:
$R_1$ is selected from the group consisting of:
$(C_2-C_{20})$alkyl;
$(C_3-C_{10})$cycloalkyl;
3-10 membered heterocycloalkyl;
$(C_6-C_{10})$aryl; and
5-10 membered heteroaryl;
wherein said alkyl, cycloalkyl, heterocycloalkyl, aryl and heteroaryl groups are optionally substituted by one or more substituent(s) selected from the group consisting of: —OH, halogen atom, —C(O)OH, —$(C_1-C_{10})$alkyl, —$(C_1-C_{10})$alkoxy, and —$NR_7R_8$ group, wherein $R_7$ and $R_8$ are independently of each other selected from $(C_1-C_{10})$alkyl and H;

$R_2$ is selected from the group consisting of:
H;
$(C_1-C_{20})$alkyl;
$(C_3-C_{10})$cycloalkyl;
$(C_6-C_{10})$aryl; and
5-10 membered heteroaryl;
or $R_2$ and $R_4$ together with the carbon atoms carrying them form a $(C_3-C_{10})$cycloalkyl group;
wherein said alkyl, cycloalkyl, heterocycloalkyl, aryl and heteroaryl groups are optionally substituted by one or more substituent(s) selected from the group consisting of: —OH, halogen atom, —C(O)OH, —$(C_1-C_{10})$alkyl, —(C$_1$-C$_{10}$)alkoxy, and —NR$_7$R$_8$ group, wherein R$_7$ and R$_8$ are independently of each other selected from (C$_1$-C$_{10}$)alkyl and H;

R$_3$ is selected from the group consisting of:
(C$_3$-C$_{10}$)cycloalkyl;
3-10 membered heterocycloalkyl;
(C$_6$-C$_{10}$)aryl; and
5-10 membered heteroaryl;
wherein said cycloalkyl, heterocycloalkyl, aryl and heteroaryl groups are optionally substituted by one or more substituent(s) selected from the group consisting of: —OH, halogen atom, —C(O)OH, —(C$_1$-C$_{10}$)alkyl, —(C$_1$-C$_{10}$)alkoxy, and —NR$_7$R$_8$ group, wherein R$_7$ and R$_8$ are independently of each other selected from (C$_1$-C$_{10}$)alkyl and H; and R$_4$ is selected from the group consisting of: H, —OH, —NRxRy and —C(O)ORz, Rx, Ry and Rz being independently of each other H or a (C$_1$-C$_{10}$)alkyl;

or R$_2$ and R$_4$ together with the carbon atoms carrying them form a (C$_3$-C$_{10}$)cycloalkyl group;

or its pharmaceutically acceptable salt, racemate, diastereomer or enantiomer.

13. The method according to claim 1, wherein, in formula (II), R$_3$ is a (C$_6$-C$_{10}$)aryl optionally substituted by one or more substituent(s) selected from the group consisting of: (C$_1$-C$_{10}$)alkyl and halogen atom.

14. A method of treatment of idiopathic pulmonary fibrosis, said method comprising the administration of a pharmaceutical acceptable amount of an EPAC1 inhibitor to a patient in need thereof, wherein the EPAC1 inhibitor has:
the following formula (I):

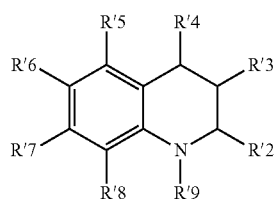

(I)

wherein:
R'9 is H or

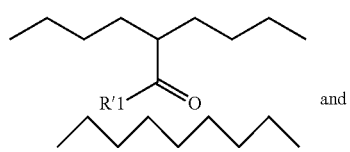

and is the attachment to the nitrogen atom of the tetrahydroquinoline;

R'1, R'2, R'3, R'4, and R'8 are independently chosen from the group consisting of: H, (C$_1$-C$_{10}$)alkyl, (C$_3$-C$_{10}$)cycloalkyl, (C$_6$-C$_{10}$)aryl, (C$_1$-C$_6$)alkylene-(C$_6$-C$_{10}$)aryl and (C$_3$-C$_{10}$)heteroaryl, said aryl and heteroaryl groups being possibly substituted by at least one substituent chosen from: OH, NH$_2$, NO$_2$, (C$_1$-C$_6$)alkyl, and halogen;

R'5 is an halogen atom;

R'6 and R'7 are independently chosen from the group consisting of: H and halogen atoms;

or its pharmaceutically acceptable salts, racemates, diastereomers or enantiomers, the compound of formula (I) being different from the following compound:

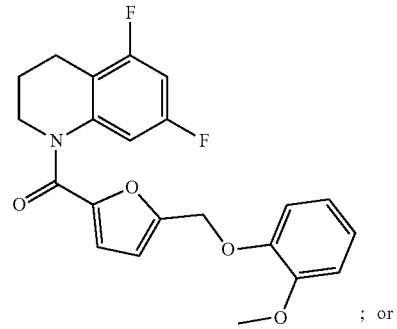 [SMILES: COc1ccccc1OCc1ccc(C(=O)N2CCCc3c(F)cc(F)cc32)o1]

; or the following formula (II):

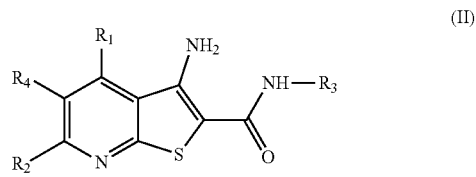

(II)

wherein:
R$_1$ is selected from the group consisting of:
(C$_2$-C$_{20}$)alkyl;
(C$_3$-C$_{10}$)cycloalkyl;
3-10 membered heterocycloalkyl;
(C$_6$-C$_{10}$)aryl; and
5-10 membered heteroaryl;
wherein said alkyl, cycloalkyl, heterocycloalkyl, aryl and heteroaryl groups are optionally substituted by one or more substituent(s) selected from the group consisting of: —OH, halogen atom, —C(O)OH, —(C$_1$-C$_{10}$)alkyl, —(C$_1$-C$_{10}$)alkoxy, and —NR$_7$R$_8$ group, wherein R$_7$ and R$_8$ are independently of each other selected from (C$_1$-C$_{10}$)alkyl and H;

R$_2$ is selected from the group consisting of:
H;
(C$_1$-C$_{20}$)alkyl;
(C$_3$-C$_{10}$)cycloalkyl;
(C$_6$-C$_{10}$)aryl; and
5-10 membered heteroaryl;
or R$_2$ and R$_4$ together with the carbon atoms carrying them form a (C$_3$-C$_{10}$)cycloalkyl group;
wherein said alkyl, cycloalkyl, heterocycloalkyl, aryl and heteroaryl groups are optionally substituted by one or more substituent(s) selected from the group consisting of: —OH, halogen atom, —C(O)OH, —(C$_1$-C$_{10}$)alkyl, —(C$_1$-C$_{10}$)alkoxy, and —NR$_7$R$_8$ group, wherein R$_7$ and R$_8$ are independently of each other selected from (C$_1$-C$_{10}$)alkyl and H;

R$_3$ is selected from the group consisting of:
(C$_3$-C$_{10}$)cycloalkyl;
3-10 membered heterocycloalkyl;
(C$_6$-C$_{10}$)aryl; and
5-10 membered heteroaryl;
wherein said cycloalkyl, heterocycloalkyl, aryl and heteroaryl groups are optionally substituted by one or more substituent(s) selected from the group consisting of: —OH, halogen atom, —C(O)OH, —($C_1$-$C_{10}$)alkyl, —($C_1$-$C_{10}$)alkoxy, and —$NR_7R_8$ group, wherein $R_7$ and $R_8$ are independently of each other selected from ($C_1$-$C_{10}$)alkyl and H; and $R_4$ is selected from the group consisting of: H, —OH, —NRxRy and —C(O)ORz, Rx, Ry and Rz being independently of each other H or a ($C_1$-$C_{10}$)alkyl; or $R_2$ and $R_4$ together with the carbon atoms carrying them form a ($C_3$-$C_{10}$)cycloalkyl group;

or its pharmaceutically acceptable salt, racemate, diastereomer or enantiomer.

* * * * *